(12) United States Patent
Harish et al.

(10) Patent No.: US 7,775,130 B2
(45) Date of Patent: Aug. 17, 2010

(54) CAPACITIVE SENSOR BASED INVENTORY CONTROL

(75) Inventors: Diyyasimba Harish, Union City, CA (US); John Schultz, Santa Clara, CA (US); King Wong, Saratoga, CA (US); Jonathan T. Lim, Fremont, CA (US)

(73) Assignee: Load Star Sensors, Inc, Fremont, CA (US)

( * ) Notice: Subject to any disclaimer, the term of this patent is extended or adjusted under 35 U.S.C. 154(b) by 269 days.

(21) Appl. No.: 11/925,709

(22) Filed: Oct. 26, 2007

(65) Prior Publication Data

US 2009/0114041 A1 May 7, 2009

Related U.S. Application Data

(60) Provisional application No. 60/854,997, filed on Oct. 26, 2006, provisional application No. 60/854,799, filed on Oct. 27, 2006.

(51) Int. Cl.
  *G01L 1/12* (2006.01)
(52) U.S. Cl. .................... 73/862.626; 73/780
(58) Field of Classification Search .............. 73/780, 73/862.626
  See application file for complete search history.

(56) References Cited

U.S. PATENT DOCUMENTS

| | | | | |
|---|---|---|---|---|
| 5,647,974 | A | * | 7/1997 | Shim et al. .................. 210/103 |
| 6,802,222 | B2 | * | 10/2004 | Ishio et al. ..................... 73/718 |
| 2007/0040814 | A1 | * | 2/2007 | Lee et al. ..................... 345/173 |

* cited by examiner

*Primary Examiner*—Max Noori
(74) *Attorney, Agent, or Firm*—Raj Abhyanker, P.C.

(57) ABSTRACT

A method, apparatus and system of capacitive sensor based inventory control is disclosed. In one embodiment, an inventory management system includes a first conductive surface and a second conductive surface substantially parallel to the first conductive surface, a sensor to generate a measurement based on a change in a distance between the first conductive surface and the second conductive surface, a scale formed with a set of plates having inserted between the set of plates the first conductive surface and the second conductive surface and a container placed above the scale such that an item (e.g., a liquid, a solid, a discrete part, a powder and/or a gas, etc.) of the container is weighed through the measurement. The inventory management system may further include a reference capacitor associated with the apparatus to enable the sensor to adjust the measurement based on the environmental condition.

18 Claims, 23 Drawing Sheets

CAPACITIVE SENSOR BASED INVENTORY CONTROL

CLAIMS OF PRIORITY

This United States patent application is being filed simultaneously with an international PCT patent application titled "Capacitive Sensor Based Inventory Control" on Oct. 26, 2007.

This patent application claims priority from:
(1) U.S. Provisional patent application No. 60/854,997 titled "Capacitive Sensor Based Inventory Control" filed on Oct. 26, 2006.
(2) U.S. Provisional patent application No. 60/854,799 titled "Apparatus and Method of Weighing Indiscreet Volume using a Capacitive Sensing Technique", filed on Oct. 27, 2006.

FIELD OF TECHNOLOGY

This disclosure relates generally to the technical fields of measuring devices and, in one embodiment, to a method, apparatus and system of capacitive sensor based inventory control.

BACKGROUND

An inventory management may include checking an aggregate value of a stock of items (e.g., liquids, discrete parts, and/or goods) being used on-site and/or may replenish the stock when the aggregate value falls below a critical level (e.g., which may hamper a production and/or manufacturing schedule of a business entity). A worker may find that an item (e.g., a component, a quantity of liquid, etc.) is out of stock when a container (e.g., a bin, a shelf, a pallet, and/or other container type holding the item) runs out of the item.

When this happens, the worker may have to leave his/her post and obtain the item on his/her own and/or call a stock room to send someone with the item. This may delay a process of an ongoing production causing a waste of time and/or labor. Furthermore, the business entity (e.g., a manufacturing plant) may have to communicate with a supplier of the item when the business entity does not have the item in stock. This can delay the process of the ongoing production even more because it may take some time for the supplier of the item to deliver the item to the business entity.

Alternatively, the business may assign a person to check and/or replenish items being used on-site. The person may go around premises of the business entity (e.g., periodically and/or continually). However, a delay in replenishing some of the items may ensue when the person misses getting to containers holding the some of the items on time (e.g., especially when the business entity owns a large working area). The delay may also cause a stoppage in a process of an ongoing production of goods based on the some of the items.

Furthermore, the person may have to contact individual suppliers of the some of the items to make an order. The worker may end up risking a prompt delivery of the some of the items when the order is not conducted properly. In addition, the business entity having the large working area may have to assign more manpower to handle an inventory control of checking and/or replenishing the some of the items, contacting the individual suppliers and/or ordering the some of the components. Even when these plans may be implemented to improve the inventory control, there may be no guarantee that the inventory control will be done properly and/or efficiently.

The container may be an indiscrete volume dispenser (e.g., a beverage and/or liquid dispenser, a condiment dispenser, etc.) which can dispense (e.g., gives out) an indiscrete volume of a content to a user of the indiscrete volume dispenser. The user may press a dispense button of the indiscrete volume dispenser to obtain a desired amount of a content in the indiscrete volume dispenser, and the indiscrete volume dispenser may be repeatedly used by the user until the content runs out (e.g., out of the beverage, the condiment, etc.).

In addition, the indiscrete volume dispenser may lack a warning mechanism (e.g., automatic) when the content runs out. The user may learn of a depletion of the content when the user does not obtain a volume of the content desired by the user (e.g., when the user does not get any of the content and/or the content runs out in the middle of the dispensing).

The depletion of the content and/or inventory without any prior warning may burden the user when there is no replacement of the content at hand (e.g., especially when the user owns a business and/or the business is flooded with customers at the time the content runs out). In this case, the user may have to communicate with a supplier of the content for a quick delivery of the content to a residence and/or a business quarter of the user. The quick delivery may incur an extra cost to the user, and/or the user may incur other cost (e.g., time, inconvenience, and/or a part of the user's business if the user owns the business).

In addition, the content within the indiscrete volume dispenser may be affected by an environmental condition (e.g., a temperature, a humidity, and/or other environmental conditions exhumed by the content internal and/or external to the content of the indiscrete volume dispenser) and/or a structural feature of the content (e.g., a weight, a volume, a material, etc. of the content and/or a container holding the content). The environmental condition may affect a machine or a device that may be located inside of the indiscrete volume dispenser and/or change (e.g., spoil, heat up, cool down, etc.) a condition of the content.

SUMMARY

A method, apparatus, and system of capacitor sensor based inventory control is disclosed. In one aspect, an inventory management system includes a first conductive surface and a second conductive surface substantially parallel to the first conductive surface, a sensor to generate a measurement based on a change in a distance between the first conductive surface and the second conductive surface, a scale formed with a set of plates having inserted between the set of plates the first conductive surface and the second conductive surface and a container placed above the scale such that at least one item of the container (e.g., may include a liquid, a solid, a discrete part, a powder, and/or a gas) is weighed through the measurement.

The scale may indicate a shortage of the item when the measurement of the item may vary from a tolerance weight. The change in the distance may caused by a deflection (e.g., may be a compressive force and/or an expansive force) of the first conductive surface with respect to the second conductive surface. In addition, the change in the distance may be caused by a change in thickness of at least one spacer between the first conductive surface and the second conductive surface. The change in the distance may also be caused by a load applied to the surface above the first conductive surface with respect to the second conductive surface.

The sensor applies an algorithm that converts a change in capacitance to at least one of a change in voltage and a change in frequency to generate the measurement. The measurement may be of a force applied to a surface above the first conductive surface with respect to the second conductive surface.

The first conductive surface and the second conductive surface form a sensor capacitor. A change in capacitance of the sensor capacitor may be inversely proportional to the change in the distance between the first conductive surface and the second conductive surface.

In addition, the inventory management system includes a reference capacitor associated with the apparatus to enable the sensor to adjust the measurement based on at least one environmental condition (e.g., may be humidity in a gap between the first conductive surface and the second conductive surface, a temperature of the apparatus and/or an air pressure of an environment surrounding the apparatus).

The first conductive surface and the second conductive surface may be fabricated in any geometric shape, including a rectangular shape, an oval shape and/or a shape having sides that are not all the same length. In addition, the first conductive surface and the second conductive surface may be painted on a plurality of nonconductive printed circuit boards forming the apparatus In another aspect, an inventory management system includes a reference capacitor whose capacitance changes based on an environmental condition surrounding the apparatus, a sensor capacitor whose capacitance changes based on a deflection of at least one plate forming the sensor capacitor and the environmental condition and a circuit to determine a weight of the item of a bin when the bin having the item is placed on a surface of the sensor capacitor after removing an effect of the environmental condition from a capacitance of the sensor capacitor.

In addition, the inventory management system may include a housing that encompasses the reference capacitor, the sensor capacitor, and/or the circuit. The plate experiencing the deflection is integrated in the housing. The housing may be formed by metal plates (e.g., that are each laser etched and bonded together to create the housing). In addition, the housing may be formed by a single metal block that is milled to form the housing, and the deflection of the plate forming the sensor capacitor is caused by a load applied to the housing and the measurement is of a force applied to the housing.

The inventory management system may also include a shielding spacer between the reference capacitor and a bottom of the housing to minimize an effect of a stray capacitance affecting the measurement. A height of the shielding spacer is at least ten times larger than a plate spacer between plates of the reference capacitor and between plates of the sensor capacitor. An area of each plate forming the reference capacitor is at least ten times larger than an area of each plate forming the sensor capacitor to reduce the amount of amplification required in generating the measurement.

The circuit may include a wireless transmitter and a wireless receiver and the apparatus may communicate through a network with a data processing system that analyzes data generated by various operations of the apparatus.

In yet another aspect, a method includes automatically generating a measurement of weight based on a change in a distance between a first conductive surface and a second conductive surface forming a variable capacitor when an item is placed on a surface of at least one of the first conductive surface and the second conductive surface and communicating the measurement to an inventory management system associated with the variable capacitor.

In addition, the method includes forming a scale formed with a set of plates having inserted between the set of plates the first conductive surface and the second conductive surface, placing a container adjacent to the scale such that item of the container (e.g., may include a liquid, a fluid, a solid, a discrete part, a powder, and/or a gas) is weighed through the measurement and indicating a shortage of the item when the measurement of the item varies from a tolerance weight.

The change in the distance may be caused by a deflection (e.g., may be a compressive force and/or an expansive force) of the first conductive surface with respect to the second conductive surface. In addition, the change in the distance may be caused by a change in thickness of spacer between the first conductive surface and the second conductive surface.

The method may include applying an algorithm that converts a change in capacitance to at least one of a change in voltage and a change in frequency to generate the measurement and the measurement may be of a force applied to a surface above the first conductive surface with respect to the second conductive surface, adjusting the measurement based on environmental condition (e.g., may be humidity in a gap between the first conductive surface and the second conductive surface, a temperature of the apparatus and/or an air pressure of an environment surrounding the apparatus) by analyzing data of a reference capacitor, fabricating the variable capacitor and the reference capacitor in any geometric shape, including a rectangular shape, an oval shape, and a shape having sides that are not all the same length and painting the first conductive surface and the second conductive surface on a plurality of nonconductive printed circuit boards.

The change in the distance may be caused by a load applied to the surface above the first conductive surface with respect to the second conductive surface (e.g., a force vector). A change in capacitance of the variable capacitor may be inversely proportional to the change in the distance between the first conductive surface and the second conductive surface.

The method may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus and system of capacitive sensor based inventory control is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
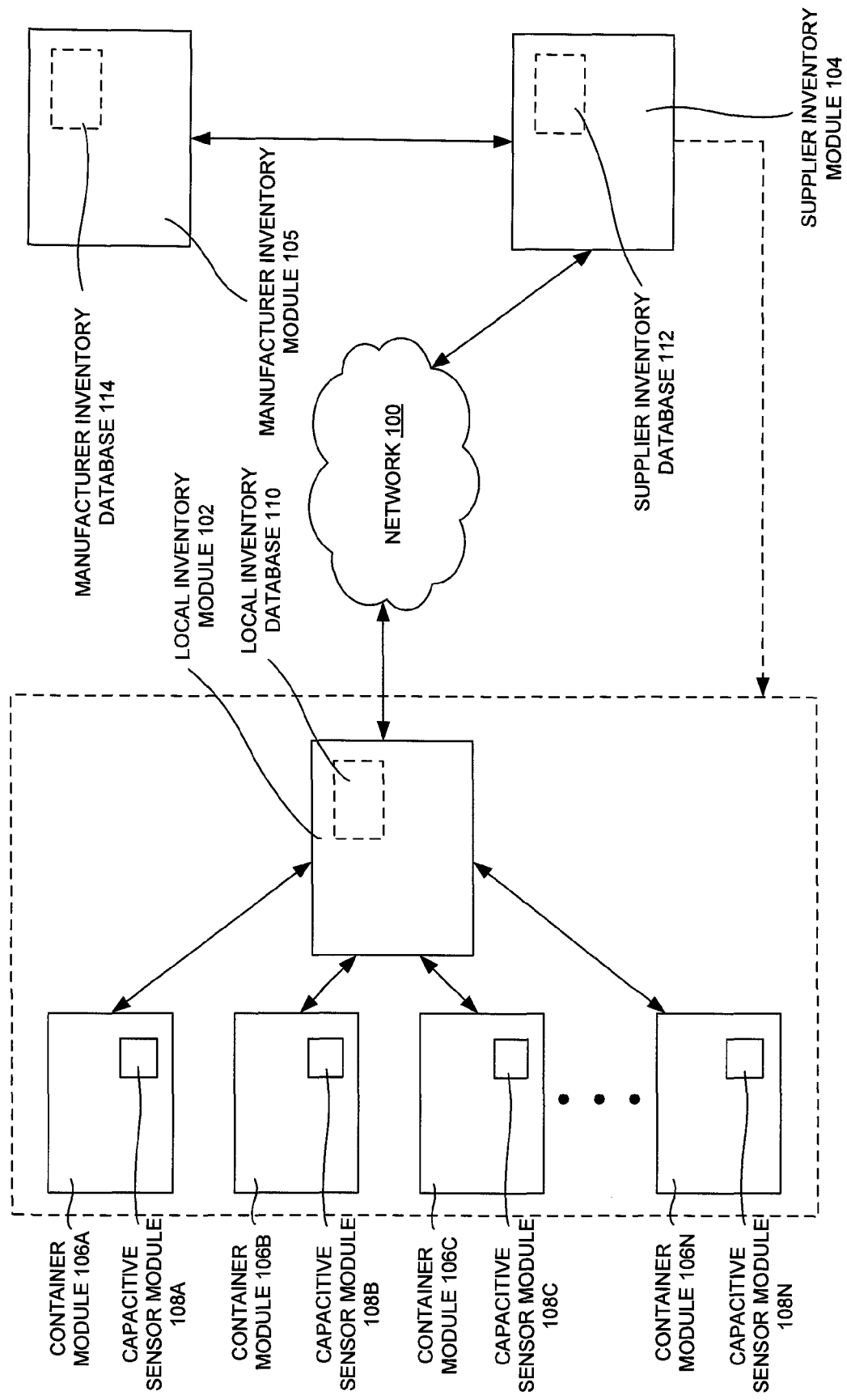
FIG. 1 is a system diagram of a local inventory module associated with a plurality of container modules based on capacitive sensor modules, according to one embodiment.

FIG. 1 is a system diagram of a local inventory module 102 associated with a plurality of container modules 106 based on capacitive sensor modules 108, according to one embodiment. Particularly, FIG. 1 illustrates a network 100, the local inventory module 102, a supplier inventory module 104, a manufacturer inventory module 105, the container module 106, the capacitive sensor module 108, a local inventory database 110, a supplier inventory database 112, and/or a manufacturer inventory database 114.

The network 100 may be an Internet, an Ethernet, a Radio Frequency (RF) network, a telecommunications (e.g., mobile) network, a wide area network (WAN), a local area network (LAN) (e.g., using USB, Bluetooth, WiFi, Zigbee, etc.), a wireless network (e.g., Wi-Fi, Wi-Max, etc.), and/or a storage area network (SAN), etc. The local inventory module 102 may be an on-site database management system which oversees an inventory control of parts and/or components necessary for a production of goods being manufactured locally. The local inventory module 102 may include a communication module to interact (e.g., transmit and/or receive data) with the container module 106 (e.g., especially with the capacitive sensor module 108) and a data processing system (e.g., a data processing system 804 of FIG. 8) as well as the local inventory database 110. For example, the communication module may use technology such as USB, Bluetooth, WiFi and/or Zigbee, etc. to communicate between the capacitive sensor modules 108, the container modules 106, interface devices and the data processing system 804.

The supplier inventory module 104 may be a database management system of a supplier which oversees an inventory control of parts and/or components necessary for a production of goods being manufactured in a business entity (e.g., a manufacturing plant, a laboratory, etc. using goods and/or services of the supplier). The supplier inventory module 104 may include a communication module to interact (e.g., transmit and/or receive data) with the local inventory module 102 as well as the supplier inventory database 112.

The manufacturer inventory module 105 may be a database management system kept by a manufacturer which oversees an inventory control of parts and/or components necessary for a supply of parts and/or goods being used in a business entity (e.g., a supplier). The manufacturer inventory module 105 may include a communication module to interact (e.g., transmit and/or receive data) with the supplier inventory module 104 as well as the manufacturer inventory database 114.

The container module 106 may be a bin (e.g., the bin 200 of FIG. 2), a shelf (e.g., the shelf 300 of FIG. 3), a pallet (e.g., the pallet 400 of FIG. 4), and/or other containers, each having a capacitive sensor module 108. The capacitive sensor module 108 may be a load-sensing (e.g., weight, force, etc.) device using capacitive sensing techniques, as illustrated in FIGS. 5, 6, and/or 7. In alternate embodiments, the capacitive sensor module 108 (e.g., the load sensing device used for inventory control) may be based on various capacitive load sensing techniques (e.g., area-change, gap-change and/or cylindrical capacitive sensors).

The capacitive sensor module 108 may include an alarm circuit which may initiate an alarm sound (e.g., light a warning light and/or communicates an email and/or instant message alert) when the parts and/or components in the container module 106 having the capacitive sensor module 108 fall below a critical value (e.g., which may be set by an administrator).

The local inventory database 110 may be a database (e.g., relational, hierarchical, etc.) detailing a quantity, a status, and/or order information of parts and/or components located in the container module 106 (e.g., based on a measurement data of the capacitive sensor module 108).

The supplier inventory database 112 may be a database (e.g., relational, hierarchical, etc.) detailing a quantity, a status, and/or order information of parts and/or components of the business entity (e.g., based on a measurement data of the capacitive sensor module 108 and/or a partiality and/or an entirety of the local inventory database 110). The manufacturer inventory database 114 may be a database (e.g., relational, hierarchical, etc.) detailing a quantity, a status, and/or order information of parts and/or components by a supplier.

For example, as illustrated in FIG. 1, the capacitive sensor module 108A of the container module 106A may communicate a status (e.g., a quantity of parts in the container module 106A) to a local inventory module 102 wirelessly and/or through a wire. A data (e.g., which may be based on an analog signal and/or a digital signal) containing the status of the local inventory module 102 may be processed through the data processing system (e.g., which may convert, decipher, format, etc.) to store into the local inventory database 110.

The local inventory database 110 may indicate any shortage of the parts and/or the components when the capacitive sensor module 108A senses a weight of the parts and/or a load of the parts in the container module 106A goes below a critical value (e.g., which may be used to determine a time to replenish the container module 106A with the parts).

The local inventory module 102 may communicate with the supplier inventory module 104 through the network 100. When an order of any component shortage is communicated from the local inventory module 102 to the supplier inventory module 104, the supplier inventory module 104 may initiate a command for a vehicle to deliver the order to a client which initiated the order. In an alternative example, when an order of any component shortage is communicated from the supplier inventory module 104 to the manufacturer inventory module 105, the manufacturer inventory module 105 may initiate a command for a vehicle to deliver the order to the supplier which initiated the order.

Figure 2:
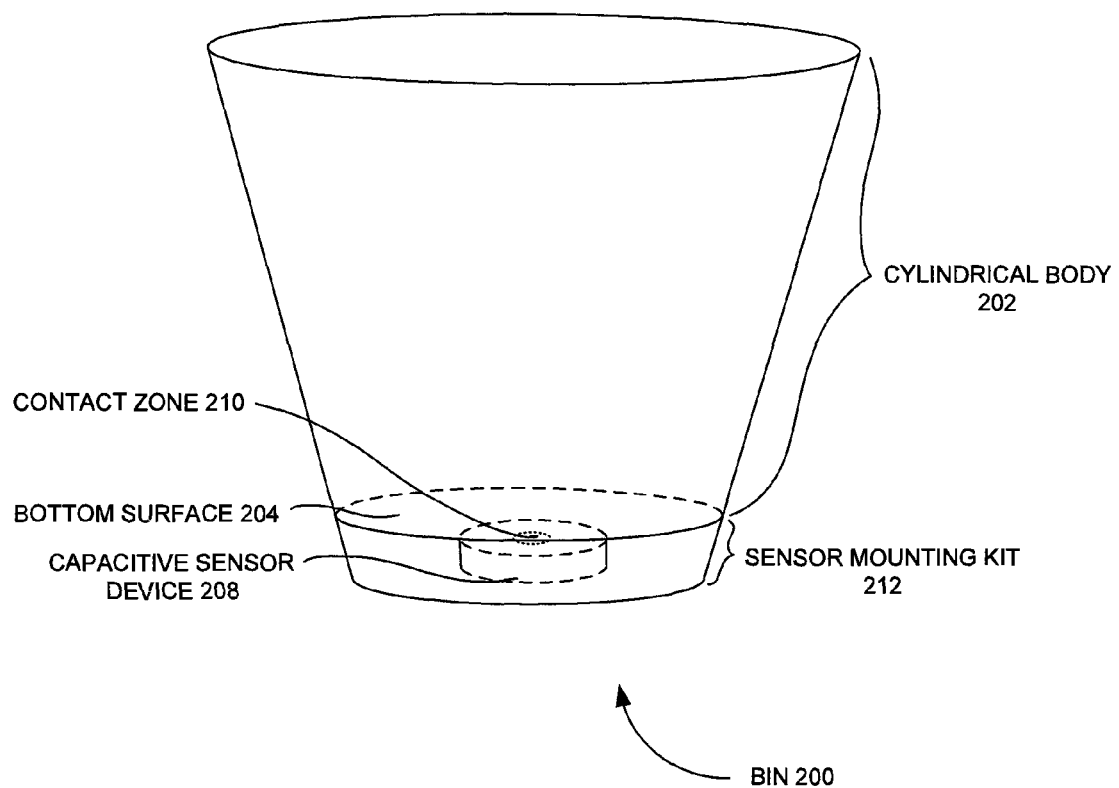
FIG. 2 is a three-dimensional view of a bin having a capacitive sensor device, according to one embodiment.

FIG. 2 is a three-dimensional view of a bin 200 having a capacitive sensor device 208, according to one embodiment. Particularly, FIG. 2 illustrates a bin 200 having a cylindrical body 202, a bottom surface 204, a capacitive sensor device 208, a contact zone 210, and/or a sensor mounting kit 212. The bin 200 may be a container to measure (e.g., automatically and/or continuously) a weight of a discrete component (e.g., a nut, a bolt, a screw, etc.) and/or an indiscrete volume (e.g., a beverage, a liquid chemical, etc.) and/or communicate (e.g., via a cable, via a wireless RF network, Wi-Fi, Wi-Max, USB, Bluetooth, Zigbee, etc.) its inventory level (e.g., of the discrete component and/or the indiscrete volume) to the local inventory module 102 of FIG. 1. The bin 200 may also alert for specific conditions which includes a threshold value (e.g., for reordering of the discrete component and/or the indiscrete volume), an out of stock warning, a malfunction of the bin 200, etc.

The cylindrical body 202 may prevent the discrete component and/or the indiscrete component from escaping the bin 200. The bottom surface 204 may be a medium between the discrete component (e.g., and/or the indiscrete component) and the capacitive sensor device 208. A weight of the discrete component may depress the bottom surface which may in turn press down the contact zone 210 of the capacitive sensor device 208. The capacitive sensor device 208 may be a variable sensor based on a measurement of capacitance as will be illustrated more in details in FIGS. 5, 6 and/or 7.

The contact zone 210 may be a junction point (e.g., which may be a nut mounted on the capacitive sensor device 208, a single and/or multiple mounds of the capacitive sensor device 208, etc.) which may be depressed when a weight of discrete and/or indiscrete components is applied on the bin 200. The sensor mounting kit 212 may be a mechanical mechanism (e.g., which may includes fasteners, chambers, supports, etc.) to mount the capacitive sensor device 208 under the bottom surface 204 such that an optimum contact may be realized between the bottom surface 204 and the contact zone 210 when a weight (e.g., of the discrete components and/or indiscrete volume) is applied on the bottom surface 204.

Figure 3:
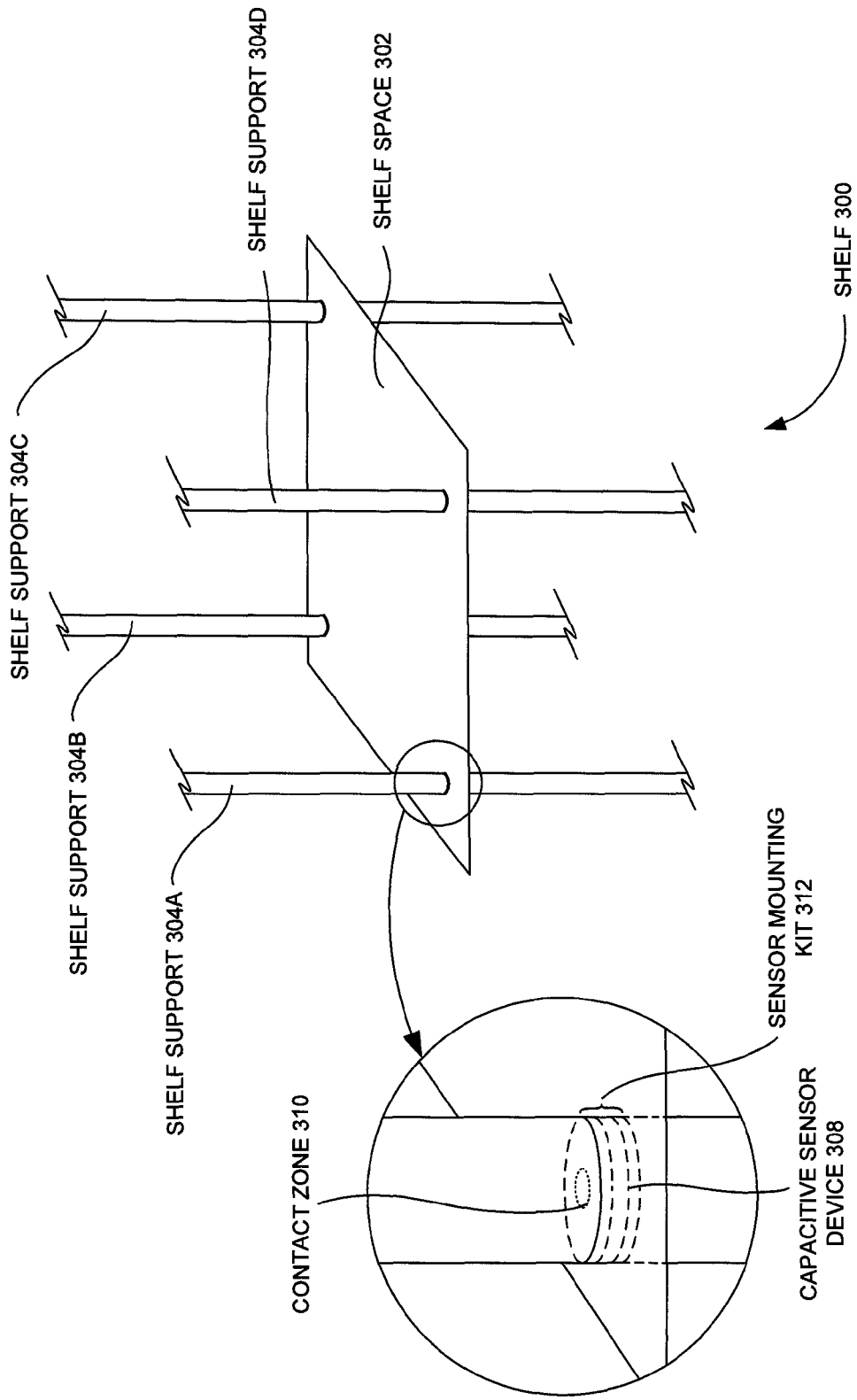
FIG. 3 is a three-dimensional view of a shelf having a capacitive sensor device, according to one embodiment.

FIG. 3 is a three-dimensional view of a shelf 300 having a capacitive sensor device 308, according to one embodiment. Particularly, FIG. 3 illustrates the shelf 300 having a shelf space 302, a shelf support 304, a capacitive sensor device 308, a contact zone 310, and/or a sensor mounting kit 312. The shelf 300 (e.g., which may be in multiple levels) may determine a number of components on the shelf 300 based on a weight of the components using the capacitive sensor device 308. The shelf 300 may also communicate (e.g., via a cable, via a wireless RF network, Wi-Fi, Wi-Max, USB, Bluetooth, Zigbee, etc.) its inventory level (e.g., of the components, contents and/or parts) to the local inventory module 102 of FIG. 1. The shelf 300 may also alert for specific conditions which includes a threshold value (e.g., for reordering of components), an out of stock warning, a malfunction of the shelf 300, etc.

The shelf space 302 may be a surface (e.g., made of a rectangular, square, round and/or other shapes of a steel, wooden, plastic, etc. material) where the components may be placed. The shelf support 304 may be used to support the shelf space 302, and there may be three or more supports (e.g., legs, poles, beams, etc.) supporting the shelf 300. Each of the shelf support 304 may be made up of one and/or more parts. The capacitive sensor device 308 may be placed below the shelf space 302 but above a part of the shelf support 304. The contact zone 310 may be a junction point which may be pressed down when the shelf space 302 is depressed due to a weight of the components placed on the shelf space 302. The sensor mounting kit 312 may be a mechanism which may be used to mount the capacitive sensor device 308 such that the contact zone 310 of the capacitive sensor device 308 makes an optimum contact with the shelf space 302.

Figure 4:
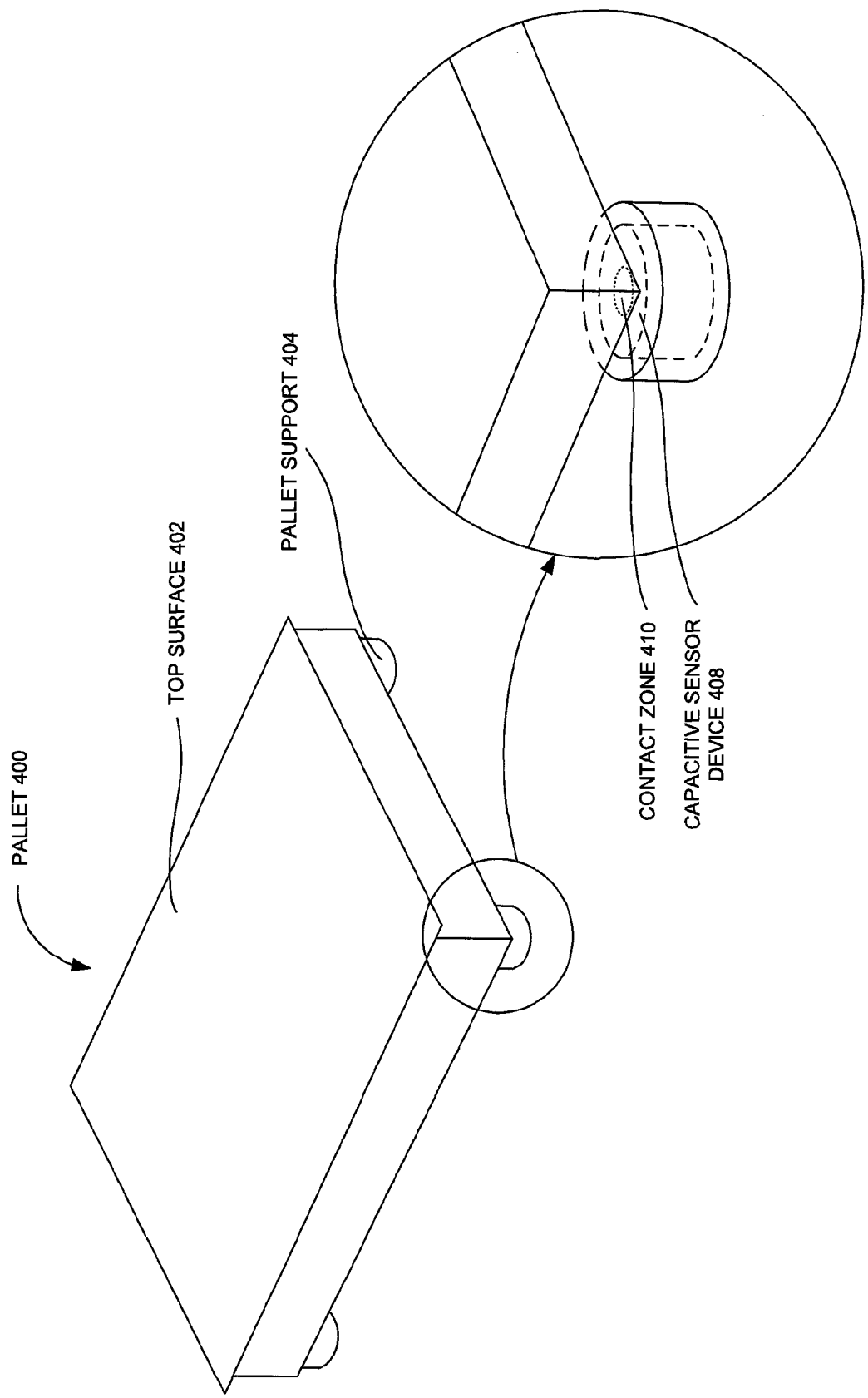
FIG. 4 is a three-dimensional diagram of a pallet having a capacitive sensor device, according to one embodiment.
Figure 5:
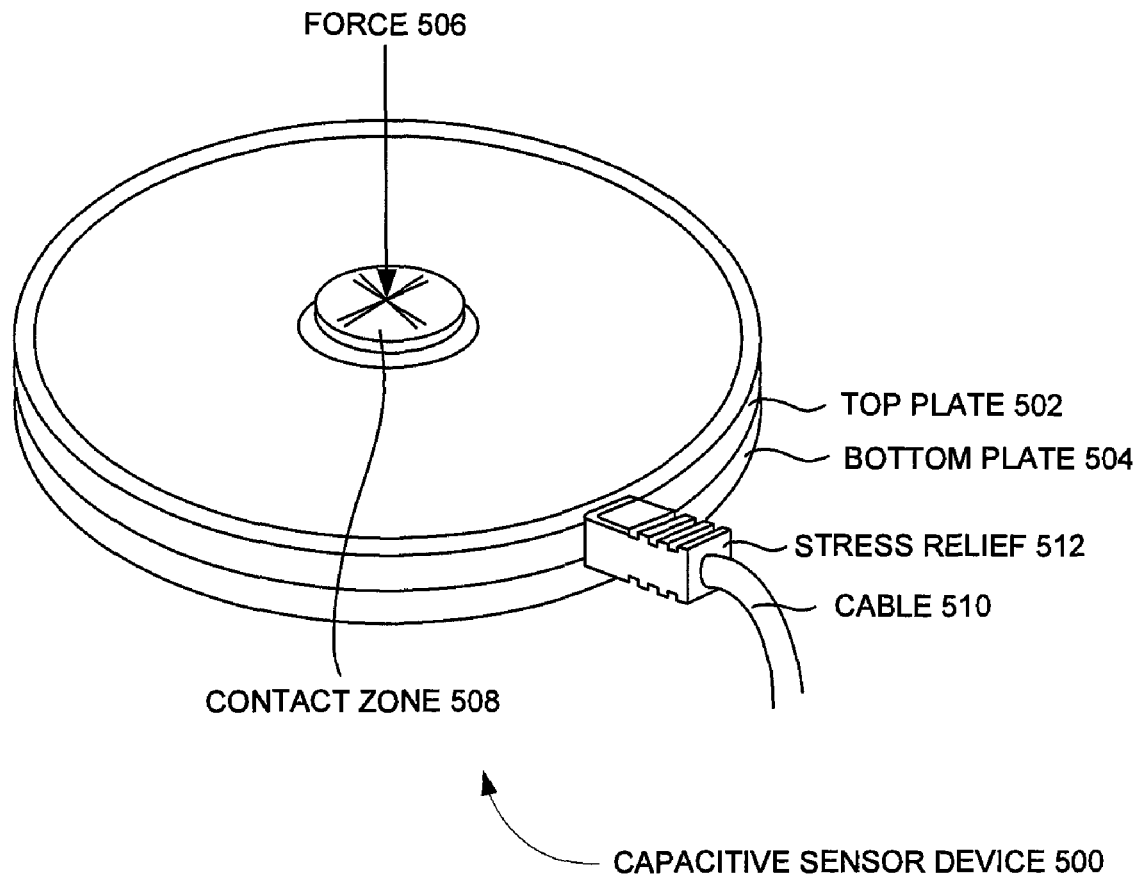
FIG. 5 is a three-dimensional view of a capacitive sensor device having at least one sensor capacitor and a reference capacitor, according to one embodiment.

FIG. 4 is a three-dimensional diagram of a pallet 400 having a capacitive sensor device 408, according to one embodiment. Particularly, FIG. 4 illustrates a pallet 400 having a top surface 402, a pallet support 404, a capacitive sensor device 408, and/or a contact zone 410. The pallet 400 may be a small, low, portable platform on which goods are placed for storage or moving (e.g., as in a warehouse or vehicle). The pallet 400 may determine a number of the goods on the pallet 400 based on a weight of the goods using the capacitive sensor device 408. The pallet 400 may also communicate (e.g., via a cable, via a wireless RF network, Wi-Fi, Wi-Max, etc.) its inventory level (e.g., of the goods) to the local inventory module 102 of FIG. 1.

The top surface 402 may be a surface (e.g., made of a rectangular, square, round and/or other shapes of a steel, wooden, plastic, etc. material) where the goods may be placed. The pallet support 404 may be used to support the top surface 402, and there may be three or more supports (e.g., legs, poles, beams, etc.) supporting the pallet 400. The capacitive sensor device 408 may be placed below each corner of the top surface 402. The contact zone 410 may be a junction point which may be pressed down when the top surface 402 is depressed due to a weight of the goods placed on the top surface 402.

FIG. 5 is a three-dimensional view of a capacitive sensor device 500 having at least one sensor capacitor (e.g., a sensor capacitor 614) and a reference capacitor (e.g., a reference capacity 616), according to one embodiment.

The capacitive sensor device 500 includes a top plate 502, a bottom plate 504, a contact zone 508, a cable 510, and a stress relief 512 (e.g., made of plastic, elastomeric material, etc.). As illustrated in FIG. 5, the contact zone 508 may provide a substantial contact surface for a force (e.g., a force 506) being applied on the capacitive sensor device 500. The cable 510 may be used to harvest (e.g., read, analyze, process, communicate, etc.) a measurement of the sensor capacitor where the stress relief 512 may be used to promote longevity of the cable 510 by absorbing a stress (e.g., shock, strain, etc.) applied on the cable 510.

In one example embodiment, the force 506 (e.g., a load, a weight, a pressure, etc.) may be applied on each of the contact zone 508 of the capacitive sensor device 500. For instance, the force 506 may be applied on the contact zone 508. The contact zone 508 contacted by the force 506 may move down an upper conductive surface the sensor capacitor 614 toward a lower conductive surface of the sensor capacitor 614 producing a change in capacitance. In another embodiment, a housing (e.g., which may include the top plate 502, the bottom plate 504, the contact zone 508, and/or a different structure) may be made of a conductive and/or a nonconductive material. In case the nonconductive material is being used, the nonconductive material may be painted (e.g., sputtered, coated, etc.) with the conductive material. The various components of the capacitive sensor device 500 may be best understood with reference to FIGS. 6 and 7.

Figure 6A:
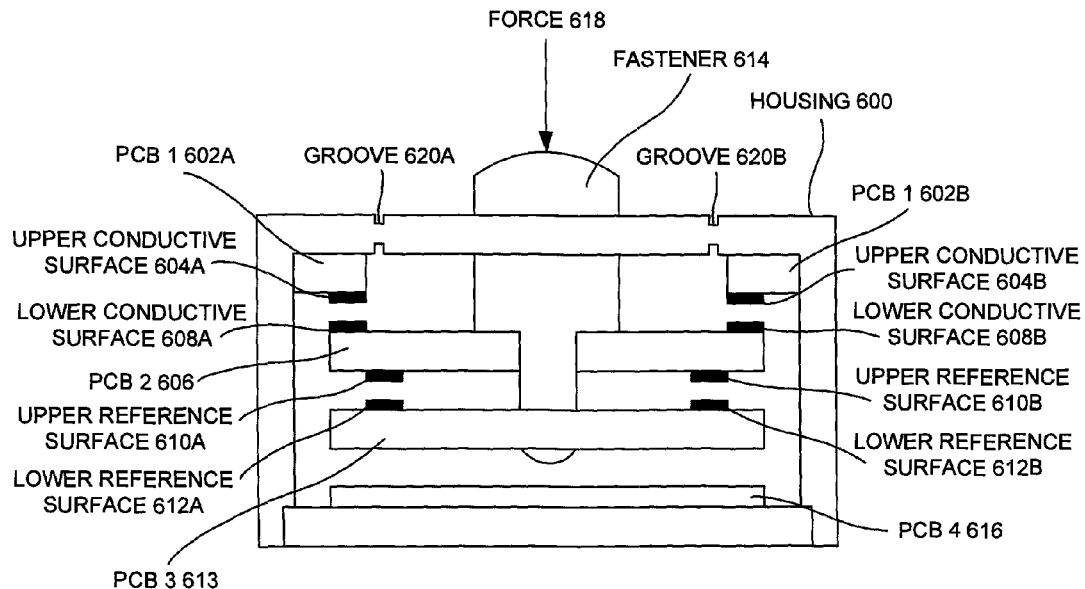
FIG. 6A is a two dimensional cross-sectional view of a capacitive sensor device, according to one embodiment.

FIG. 6A is a two dimensional cross-sectional view of a capacitive sensor device (e.g., the capacitive sensor module 108 of FIG. 1, the capacitive sensor device 800 of FIG. 8, etc.), according to one embodiment. The capacitive sensor device encompasses a sensor capacitor, a reference capacitor, and a layered circuit in a housing (e.g., made of a conductive material and/or a nonconductive material to isolate any electronic module in the housing from an external electromagnetic noise).

In an example embodiment, a housing 600 includes a printed circuit board 1 (PCB 1) 602, an upper conductive surface 604, a PCB 2 606, a lower conductive surface 608, an upper reference surface 610, a lower reference surface 612, a PCB 3 613, a fastener 614, a PCB 4 616, and/or a groove 620. The sensor capacitor may be formed between the upper conductive surface 604 and the lower conductive surface 608. The housing 600, the PCB 2 606, and/or the PCB 3 613 may be adjoined together via fastening with the fastener 614.

A deflection of a top part of the housing 600 may cause a change in a distance between two parallel conductive surfaces of the sensor capacitor when a force 618 is applied on the top part of the housing 600. The change in the distance may bring about a change in capacitance of the sensor capacitor. In one embodiment, the two parallel conductive surfaces are substantially parallel to each other and have the same physical area and/or thickness. The change in capacitance of the sensor capacitor may be inversely proportional to the change in the distance between the two parallel conductive surfaces in one embodiment.

In another example, a reference capacitor may be formed between the upper reference surface 610 and the lower reference surface 612. The reference sensor may experience a change in capacitance only for environmental factors (e.g., humidity in a gap between the first conductive surface and the second conductive surface, a temperature of the capacitive sensor device, and an air pressure of an environment surrounding the capacitive sensor device, etc.). Therefore, the environmental factors can be removed from a measurement of a change in capacitance of the sensor capacitor when the force 618 is applied to the capacitive sensor device (e.g., thereby allowing a user to determine the change in capacitance of the sensor capacitor more accurately).

In yet another example embodiment, the PCBs where the sensor capacitor and the reference capacitor are formed (e.g., the PCB 2 606 and the PCB 3 613) may be suspended in the air such that a measurement of the sensor capacitor as well as a measurement of the reference capacitor may be minimally affected by an expansion and/or a compression of the housing 600 (e.g., a bottom part of the housing 600) due to the environmental factors.

In addition, a thickness of the PCB 1 602 may be same as a thickness of the PCB 2 606 and a distance between the upper conductive surface 604 and the lower conductive surface 608 may be equal to a distance between the upper reference surface 610 and the lower reference surface 612. This may minimize an error in the measurement of the sensor capacitor as well as the reference capacitor due to the expansion and/or the compression of the housing 600 due to the environmental factors. Furthermore, the groove 620 may minimize an effect of a deflection of the housing 600 (e.g., the top part) on the PCB 1 602 when the force 618 is applied on the housing 600 such that a downward movement of the upper conductive surface 604 may be minimized.

Figure 6B:
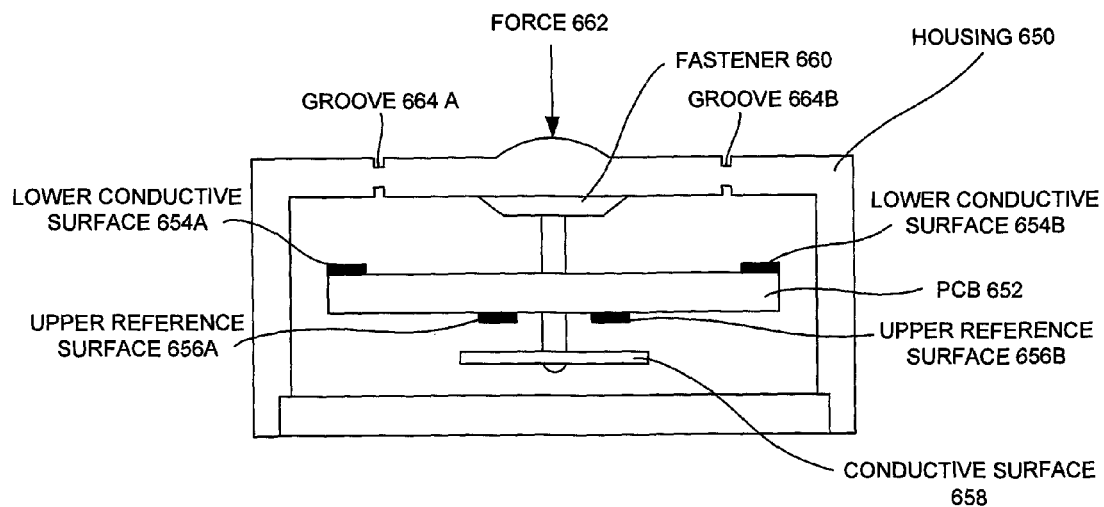
FIG. 6B is a two dimensional cross-sectional view of a capacitive sensor device having a single printed circuit board (PCB), according to one embodiment.

FIG. 6B is a two dimensional cross-sectional view of a capacitive sensor device (e.g., the capacitive sensor module 108 of FIG. 1, the capacitive sensor device 800 of FIG. 8, etc.) having a single printed circuit board (PCB) 652, according to one embodiment. The capacitive sensor device encompasses a sensor capacitor, a reference capacitor, and a layered circuit in a housing (e.g., made of a conductive material and/or a nonconductive material to isolate any electronic module in the housing from an external electromagnetic noise).

In an example embodiment, a housing 650 includes a printed circuit board (PCB) 652, a lower conductive surface 654, an upper reference surface 656, a conductive surface 658, a fastener 660, and/or a groove 664. The sensor capacitor may be formed between an inner side of a top part of the housing 650 and the lower conductive surface 654. The housing 650, the PCB 652, and/or the conductive surface 658 may be adjoined together via fastening with the fastener 660.

A deflection of a top part of the housing 650 may cause a change in a distance between two parallel conductive surfaces of the sensor capacitor when a force 662 is applied on the top part of the housing 650. The change in the distance may bring about a change in capacitance of the sensor capacitor. In one embodiment, the two parallel conductive surfaces are substantially parallel to each other and have the same physical area and/or thickness. The change in capacitance of the sensor capacitor may be inversely proportional to the change in the distance between the two parallel conductive surfaces in one embodiment.

In another example, a reference capacitor may be formed between the upper reference surface 656 and a top part of the conductive surface 658. The reference sensor may experience a change in capacitance only for environmental factors (e.g., humidity in a gap between the first conductive surface and the second conductive surface, a temperature of the capacitive sensor device, and an air pressure of an environment surrounding the capacitive sensor device, etc.). Therefore, the environmental factors can be removed from a measurement of a change in capacitance of the sensor capacitor when the force 662 is applied to the capacitive sensor device (e.g., thereby allowing a user to determine the change in capacitance of the sensor capacitor more accurately).

In yet another example embodiment, the PCB 652 and the conductive surface 658 where the sensor capacitor and the reference capacitor are formed may be suspended in the air such that a measurement of the sensor capacitor as well as a measurement of the reference capacitor may be minimally affected by an expansion and/or a compression of the housing 650 (e.g., a bottom part of the housing 650) due to the environmental factors. In addition, the groove 664 may minimize an effect of a deflection of the housing 650 (e.g., the top part) on the PCB 656 when the force 662 is applied on the housing 650 such that a downward movement of the upper conductive surface (e.g., formed on the inner side of the top part of the housing 650) may be minimized.

Figure 7:
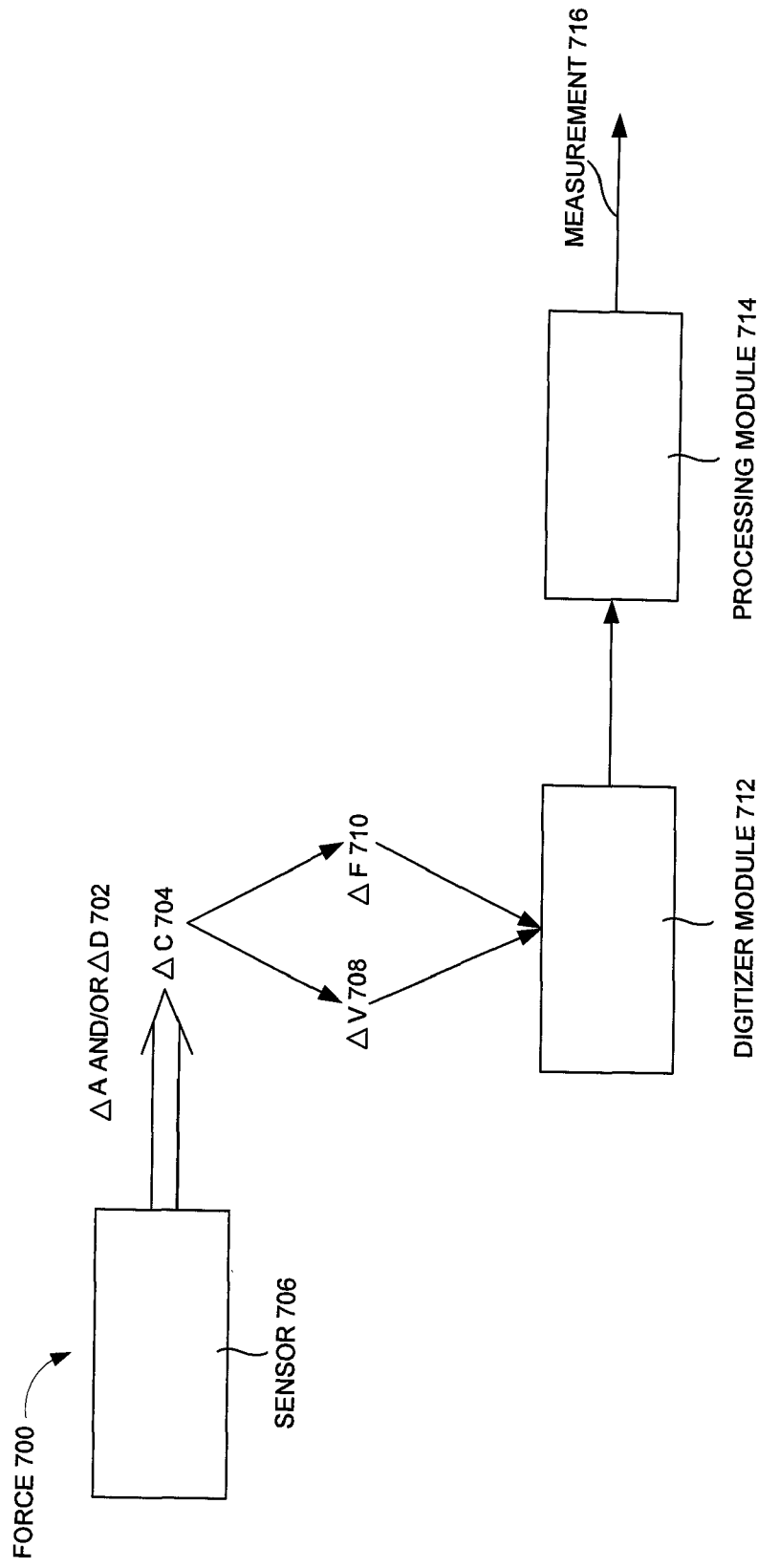
FIG. 7 is a process view of measuring a force, according to one embodiment.

FIG. 7 is a process view of measuring a force 706, according to one embodiment. In FIG. 7, an electronic circuitry (e.g., a software and/or hardware code) may apply an algorithm to measure a change in a distance 702 between two conductive plates of the sensor 700 (e.g., the sensor capacitor 614 of FIG. 6) when the force 706 is propagated to the sensor 700. In an alternate embodiment, a change in area between the plates may be considered rather than the change in the distance.

Next, a change in capacitance 704 may be calculated based on the change in the distance 702 between the two plates forming the sensor 700. The change in capacitance 704, a change in voltage 708, and/or a change in frequency 710 may also be calculated to generate a measurement (e.g., an estimation of the force 706 applied to the sensor 700). The change in capacitance 704 may be changed into the change in voltage 708 using a capacitance-to-voltage module. The change in capacitance 704 may also be converted into the change in frequency 710 using a capacitance-to-frequency module.

Furthermore, the capacitance-to-frequency module may be based on a circuit which produces a wave data with a frequency proportional to the change in capacitance 704. Thus, a higher resolution of the measurement may be possible when the frequency results in a high value (e.g., in million cycles per second) and/or is modulated to the high value. Thus, one may be able to obtain the change in frequency 710 of the sensor 700 by subtracting a number of wave forms per second when there is no force present from a number of wave forms per second when the force 706 is applied on the sensor 700.

Data which encompasses the change in capacitance 704, the change in voltage 708, and/or the change in frequency 710 may be provided to a digitizer module 712 (e.g., an analog-to-digital converter). Lastly, the digitizer module 712 may work with the processing module 714 (e.g., a microprocessor which may be integrated in a signaling circuit of the layered PCB of FIG. 6) to convert the change in capacitance 704, the change in voltage 708, and/or the change in frequency 710 to a measurement 716 (e.g., a measurement of the force 706 applied to the sensor 700).

Figure 8:
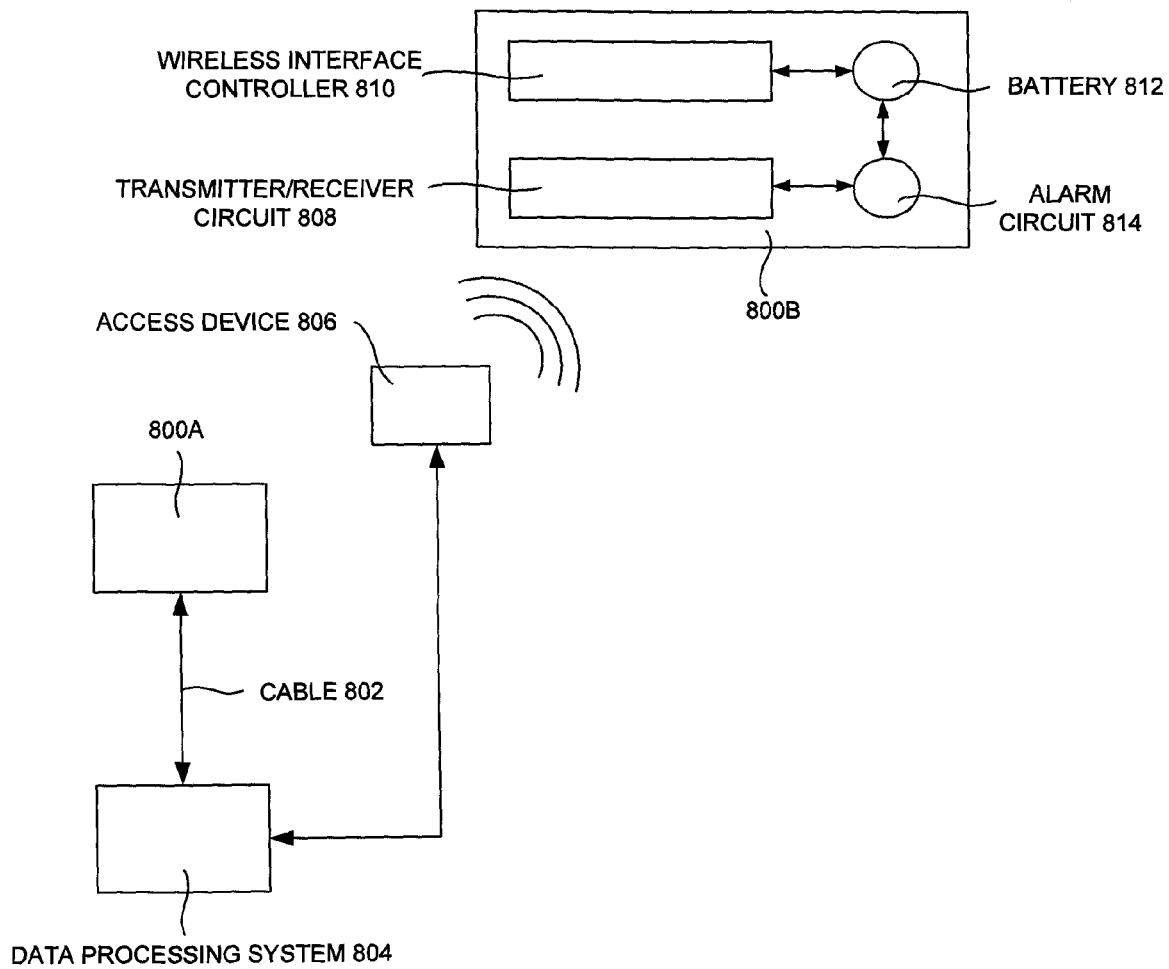
FIG. 8 is a network enabled view of a capacitive sensor device, according to one embodiment.

FIG. 8 is a network enabled view of a capacitive sensor device 800, according to one embodiment. The capacitive sensor device 800A is connected to a data processing system 804 through a cable 802 as illustrated in FIG. 8. The capacitive sensor device 800A is also connected to a network (e.g., an internet, a local area network, etc.). The capacitive sensor device 800B is wirelessly connected to the network through an access device 806 (e.g., a device which enables wireless communication between devices forming a wireless network).

The capacitive sensor device 800B includes a transmitter/receiver circuit 808 and a wireless interface controller 810 (e.g., for wireless communication), a battery 812 (e.g., to sustain as a standalone device), and an alarm circuit 814 (e.g., to alert a user when a force to the capacitive sensor device 800 B is greater than a threshold value and/or when the battery is almost out). The transmitter/receiver circuit 808 and/or the wireless interface controller 810 may be integrated into the processing module 714 of FIG. 7.

A data processing system 804 may receive data (e.g., output data measuring a force and/or a load, etc.) from the capacitive sensor device 800A and/or the capacitive sensor device 800B through the network. In one embodiment, the data processing system 804 analyzes data (e.g., measurements) generated by various operation of the capacitive sensor device 800. In another example embodiment, a universal serial bus (USB) may be included in the circuitry of the capacitive sensor device 800. The USB (e.g., a USB port or hub with mini sockets) may allow a hardware interface (e.g., user-friendly) for a data processing system (e.g., the data processing system 804) and/or a hardware interface for attaching peripheral devices (e.g., a flash drive).

Figure 9:
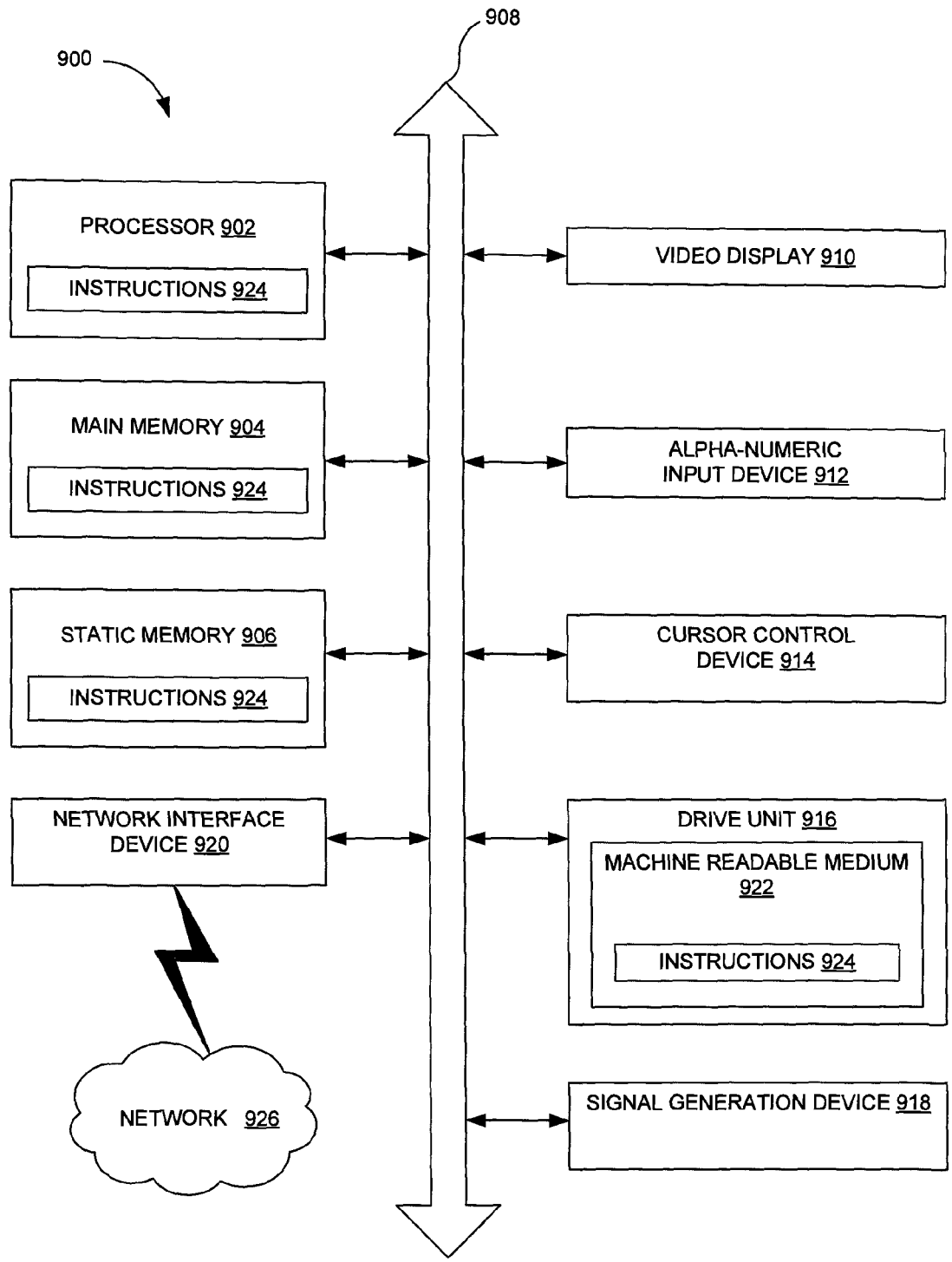
FIG. 9 is a diagrammatic representation of a computer system capable of processing a set of instructions to perform any one or more of the methodologies herein, according to one embodiment.

FIG. 9 is a diagrammatic representation of a computer system 900 capable of processing a set of instructions to perform any one or more of the methodologies herein, according to one embodiment. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment.

The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 900 includes a processor 902 (e.g., a central processing unit (CPU) a graphics processing unit (GPU) and/or both), a main memory 904 and a static memory 906, which communicate with each other via a bus 908. The computer system 900 may further include a video display unit 910 (e.g., a liquid crystal display (LCD) and/or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software 924) embodying any one or more of the methodologies and/or functions described herein. The software 924 may also reside, completely and/or at least partially, within the main memory 904 and/or within the processor 902 during execution thereof by the computer system 900, the main memory 904 and the processor 902 also constituting machine-readable media.

The software 924 may further be transmitted and/or received over a network 926 via the network interface device 920. While the machine-readable medium 922 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 10:
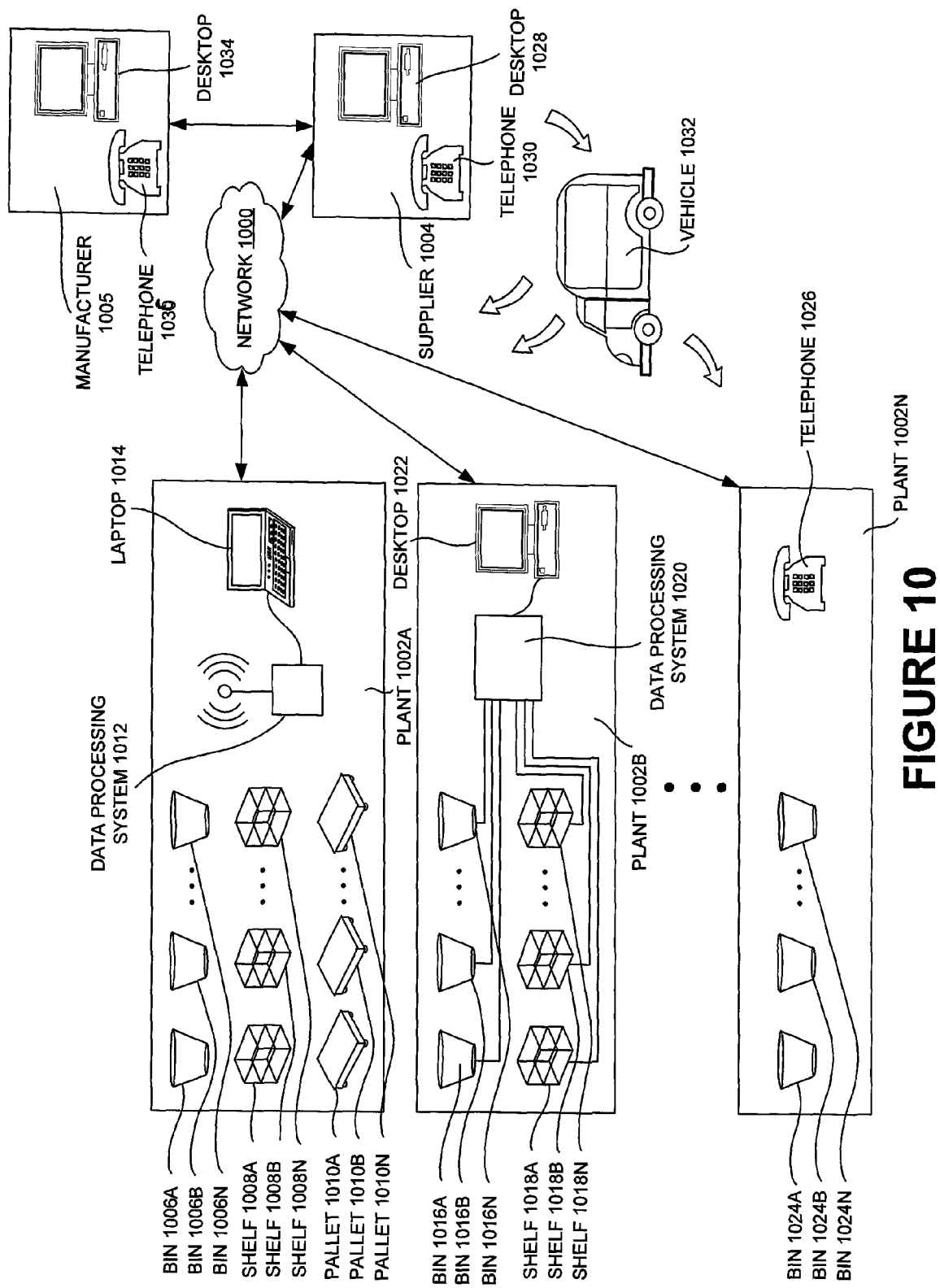
FIG. 10 is a system view of an inventory control system using a capacitive sensor device and a database management program, according to one embodiment.

FIG. 10 is a system view of an inventory control system using a capacitive sensor device and a database management program, according to one embodiment. Particularly, FIG. 10 illustrates a network 1000, a plant 1002, a supplier 1004, a manufacturer 1005, a bin 1006, a shelf 1008, a pallet 1010, a data processing system 1012, a laptop 1014, a bin 1016, a shelf 1018, a data processing system 1020, a desktop 1022, a bin 1024, a telephone 1026, a desktop 1028, a telephone 1030, a vehicle 1032, a desktop 1034, and/or a telephone 1036.

The network 1000 may be an Internet, an Ethernet, a Radio Frequency (RF) network, a telecommunications (e.g., mobile) network, a wide area network (WAN), a local area network (LAN), a wireless network (e.g., Wi-Fi, Wi-Max, etc.), and/or a storage area network (SAN), etc. The plant 1002 may be a building and/or group of buildings for the manufacture of a product. The supplier 1004 may be a person and/or an entity engaging in a business to supply a particular service and/or commodity. The manufacturer 1005 may be someone and/or an entity whose business is to manufacture a particular part and/or component. The bin 1006 (e.g., the bin 200 of FIG. 2) may be the container module 106 (e.g., wireless) of FIG. 1 having the capacitive sensor module 108 (e.g., the capacitive sensor device 800B of FIG. 8).

The capacitive sensor module 108 may be a sensor based on a capacitive sensing technique as was illustrated in more details in FIGS. 5, 6, and/or 7. The shelf 1008 (e.g., the shelf 300 of FIG. 3) may be the container module 106 (e.g., wireless) having the capacitive sensor module 108. The pallet 1010 (e.g., the pallet 400 of FIG. 4) may the container module 106 (e.g., wireless) having the capacitive sensor module 108. The data processing system 1012 may receive data (e.g., output data measuring a force and/or a load, etc.) from a capacitive sensor device (e.g., the capacitive sensor module 108 of FIG. 1) through the network 1000.

The laptop 1014 may be a computer (e.g., a data processing system as illustrated in FIG. 9) which may run a database management program (e.g., the local inventory module 102 of FIG. 1) to conduct an inventory control of parts and/or components being used by the plant 1002A. An application server may be needed when the database management program requires a larger memory space and/or an extended operational capability.

The bin 1016 (e.g., the bin 200 of FIG. 2) may be the container module 106 (e.g.; wired via an interface cable) of FIG. 1 having the capacitive sensor module 108 (e.g., the capacitive sensor device 800A of FIG. 8). The capacitive sensor module 108 may be a sensor based on a capacitive sensing technique as was illustrated in more details in FIGS. 5, 6, and/or 7. The shelf 1018 (e.g., the shelf 300 of FIG. 3) may be the container module 106 (e.g., wired through an interface cable) having the capacitive sensor module 108.

The data processing system 1020 may receive data (e.g., output data measuring a force and/or a load, etc.) from a capacitive sensor device (e.g., the capacitive sensor module 108 of FIG. 1) through the network 1000. The desktop 1022 may be a computer which may runs a database management program (e.g., the local inventory module 102 of FIG. 1) to conduct an inventory control of parts and/or components being used by the plant 1002B.

The bin 1024 (e.g., the bin 200 of FIG. 2) may be the container module 106 (e.g., wireless enabled) of FIG. 1 having the capacitive sensor module 108 (e.g., the capacitive sensor device 800B of FIG. 8). The capacitive sensor module 108 may be a sensor based on a capacitive sensing technique as was illustrated in more details in FIGS. 5, 6, and/or 7. The telephone 1026 may be used to order parts and/or services from the supplier 1004.

The desktop 1028 may be a computer which may runs a database management program (e.g., the supplier inventory module 104 of FIG. 1) to obtain and/or execute an order of the plant 1002. The telephone 1030 may be used to communicate with the plant 1002 to receiver an order of parts and/or services. The vehicle 1032 may be used to deliver the parts and/or the services to the plant 1002. The desktop 1034 may be a computer which may runs a database management program (e.g., the manufacturer inventory module 105 of FIG. 1) to obtain and/or execute an order of the supplier 1004. The telephone 1036 may be used to communicate with the supplier 1004 to receiver an order of parts and/or services.

For example, as illustrated in FIG. 10, the bin 1006, the shelf 1008, and/or the pallet 1010 may continuously and/or periodically communicate (e.g., wirelessly) a signal data indicating a status of parts and/or goods associated with them. The signal data may determine the status based on a weight measurement of the parts and/or the goods (e.g., against a threshold value). The signal data may be processed via the data processing system 1012.

The signal data then may be processed via the laptop 1014 which may have a database management program overseeing an inventory control of the parts and/or the goods. The database management program may display a status of the parts and/or the goods and/or warns the plant 1002A to replenish and/or order the parts. A local inventory data maintained by the database management program may be shared with the supplier 1004 through the network 1000. This may allow the supplier 1004 to promptly deliver the parts using the vehicle 1032.

In another example embodiment, the bin 1016 and/or the shelf 1018 may continuously and/or periodically communicate (e.g., using an interface cable) a signal data indicating a status of components associated with them. The signal data may determine the status based on a weight measurement of the components (e.g., against a threshold value). The signal data may be processed via the data processing system 1020.

The signal data then may be processed via the desktop 1022 which may have a database management program overseeing an inventory control of the parts and/or the goods. The database management program may display a status of the parts and/or warns the plant 1002B to replenish and/or order the parts. A local inventory data maintained by the database management program may be shared with the supplier 1004 through the network 1000. This may also allow the supplier 1004 to promptly deliver the parts using the vehicle 1032.

In yet another example embodiment, the bin 1024 may continuously and/or periodically oversee a status of components contained in the bin 1024 and/or warn a user of the bin 1024 when a number of the components falls below a critical value. When the user is alerted, the user may replenish the bin 1024. Alternatively, the user may call out via the telephone 1026 to order more components from the supplier 1004. In addition, the manufacturer 1005 may interact with the supplier 1004 to replenish the parts where an order of the supplier 1004 may be processed automatically through an inventory system shared between the manufacturer 1005 and the supplier 1004. Furthermore, the plant 1002, the supplier 1004, and the manufacturer 1005 may share an inventory control system to automatize a replenishment of the parts and/or the components.

Figure 11:
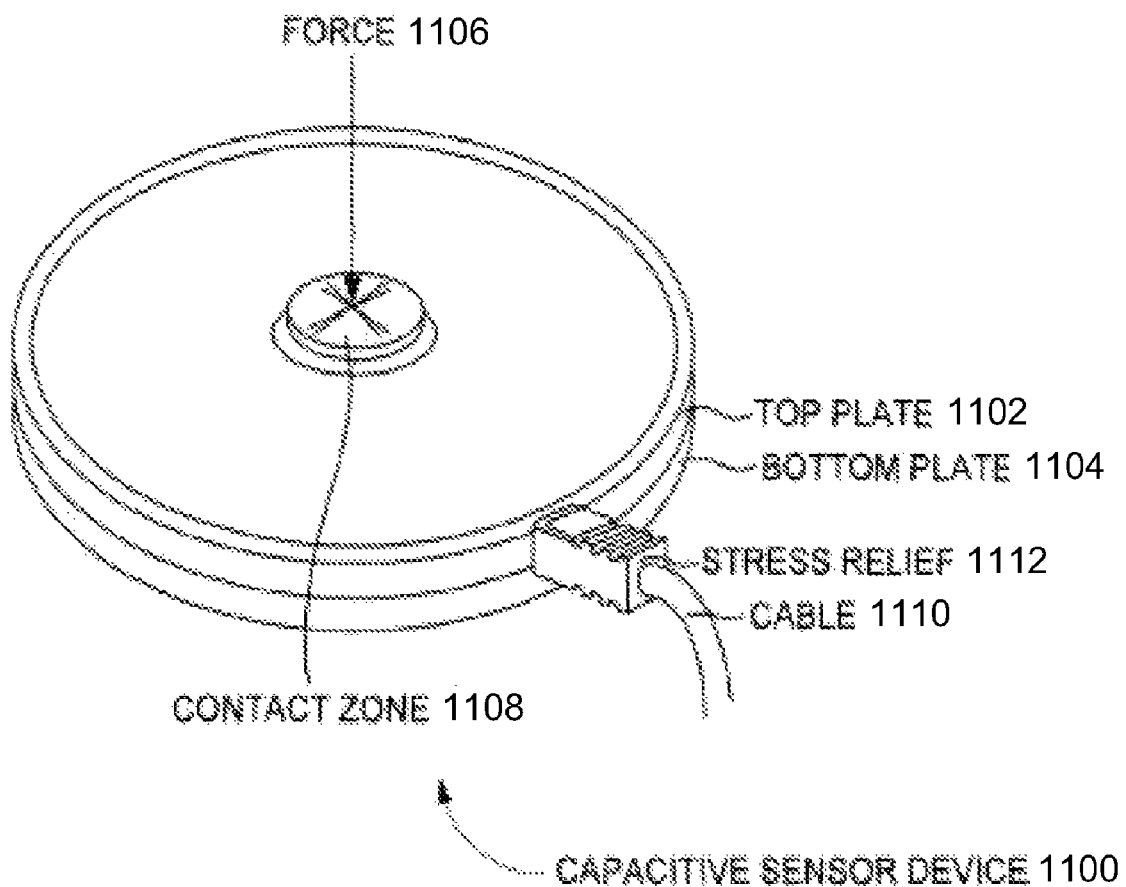
FIG. 11 is a three-dimensional view of a capacitive sensor device having at least one sensor capacitor and a reference capacitor, according to one embodiment.

FIG. 11 is a three-dimensional view of a capacitive sensor device 1100 having at least one sensor capacitor (e.g., a sensor capacitor 1214) and a reference capacitor (e.g., a reference capacity 1216), according to one embodiment.

The capacitive sensor device 1100 includes a top plate 1102, a bottom plate 1104, a contact zone 1108, a cable 1110, and a stress relief 1112 (e.g., made of plastic, elastomeric material, etc.). As illustrated in FIG. 11, the contact zone 1108 may provide a substantial contact surface for a force (e.g., a force 1106) being applied on the capacitive sensor device

1100. The cable 1110 may be used to harvest (e.g., read, analyze, process, communicate, etc.) a measurement of the sensor capacitor where the stress relief 1112 may be used to promote longevity of the cable 1110 by absorbing a stress (e.g., shock, strain, etc.) applied on the cable 1110.

In one example embodiment, the force 1106 (e.g., a load, a weight, a pressure, etc.) may be applied on each of the contact zone 1108 of the capacitive sensor device 1100. For instance, the force 1106 may be applied on the contact zone 1108 (e.g., may be a vector force). The contact zone 1108 contacted by the force 1106 may move down an upper conductive surface the sensor capacitor 1214 toward a lower conductive surface of the sensor capacitor 1214 producing a change in capacitance. In another embodiment, a housing (e.g., which may include the top plate 1102, the bottom plate 1104, the contact zone 1108, and/or a different structure) may be made of a conductive and/or a nonconductive material. In case the nonconductive material is being used, the nonconductive material may be painted (e.g., sputtered, coated, etc.) with the conductive material. The various components of the capacitive sensor device 1100 may be best understood with reference to FIGS. 12 and 13.

Figure 12:
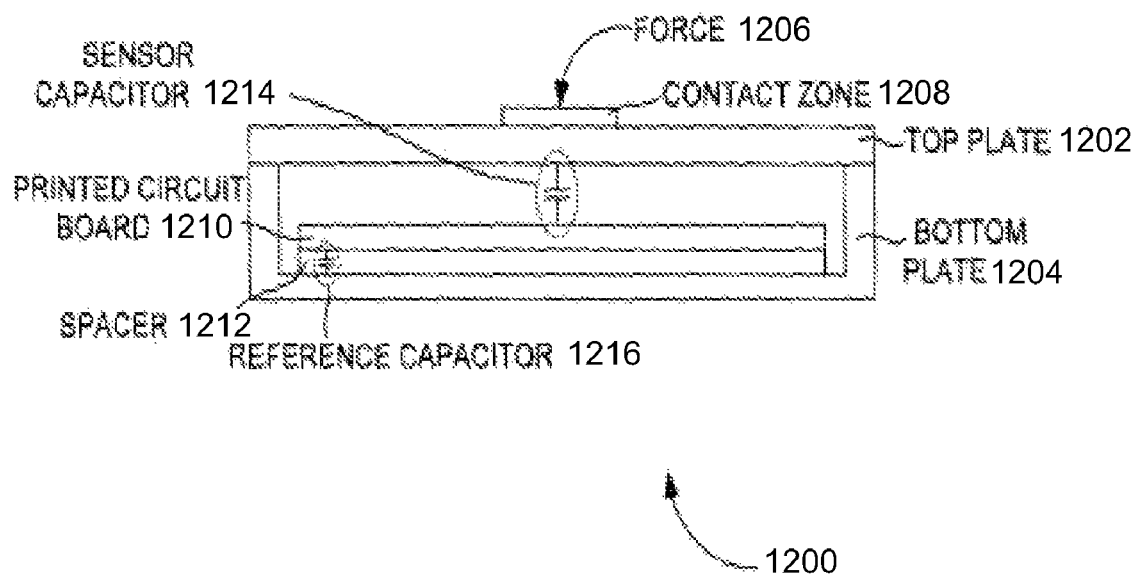
FIG. 12 is a two dimensional cross-sectional view of a capacitive sensor device, according to one embodiment.

FIG. 12 is a two dimensional cross-sectional view of a capacitive sensor device 1200, according to one embodiment. The capacitive sensor device 1200 encompasses a sensor capacitor 1214, a reference capacitor 1216, and a layered circuit in a housing (e.g., made of a conductive material and/or a nonconductive material to isolate any electronic module in the housing from an external electromagnetic noise).

In an example embodiment, the housing includes a top plate 1202, a bottom plate 1204, a contact zone 1208, a printed circuit board 1210, a spacer 1212, a sensor capacitor 1214, and/or a reference capacitor 1216. The sensor capacitor 1214 may be formed between a painted conductor surface on a top center of the printed circuit board (PCB) 1210 and a painted cavity created on a bottom surface of the top plate 1202. The top plate 1202, the PCB 1210, and the spacer 1212 may be adjoined together via fastening with a screw.

A deflection of the top plate 1202 may cause a change in a distance between two parallel conductive surfaces of the sensor capacitor 1214. The change in the distance may bring about a change in capacitance of the sensor capacitor 1214. In one embodiment, the two parallel conductive surfaces are substantially parallel to each other and have the same physical area and/or thickness. The change in capacitance of the sensor capacitor 1214 may be inversely proportional to the change in the distance between the two parallel conductive surfaces in one embodiment.

In another example, the reference capacitor 1216 may be formed between a painted conductor surface on a bottom center of the PCB 1210 and a painted cavity created on a top surface of the bottom plate 1204. The reference sensor may experience a change in capacitance only for environmental factors (e.g., humidity in a gap between the first conductive surface and the second conductive surface, a temperature of the capacitive sensor device 1200, and an air pressure of an environment surrounding the capacitive sensor device 1200, etc.). Therefore, the environmental factors can be removed from a measurement of a change in capacitance of the sensor capacitor when the force 1206 is applied to the capacitive sensor device 1200 (e.g., thereby allowing a user to determine the change in capacitance of the sensor capacitor more accurately).

Figure 13:
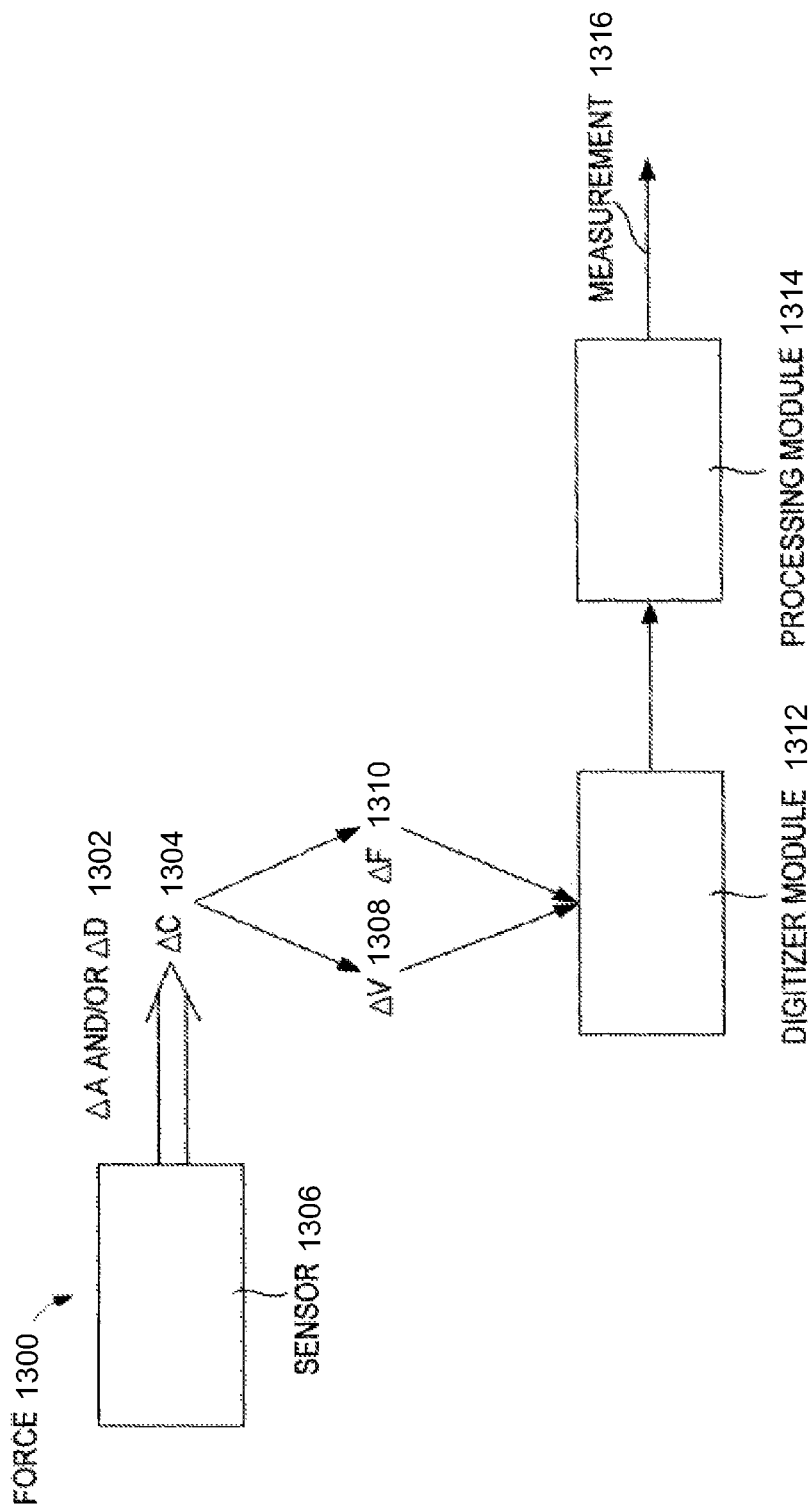
FIG. 13 is a process view of measuring a force, according to one embodiment.

FIG. 13 is a process view of measuring a force 1306, according to one embodiment. In FIG. 13, an electronic circuitry (e.g., a software and/or hardware code) may apply an algorithm to measure a change in a distance 1302 between two conductive plates of the sensor 1300 (e.g., the sensor capacitor 1214 of FIG. 12) when the force 1306 is propagated to the sensor 1300. In an alternate embodiment, a change in area between the plates may be considered rather than the change in the distance.

Next, a change in capacitance 1304 may be calculated based on the change in the distance 1302 between the two plates forming the sensor 1300. The change in capacitance 1304, a change in voltage 1308, and/or a change in frequency 1310 may also be calculated to generate a measurement (e.g., an estimation of the force 1306 applied to the sensor 1300). The change in capacitance 1304 may be changed into the change in voltage 1308 using a capacitance-to-voltage module. The change in capacitance 1304 may also be converted into the change in frequency 1310 using a capacitance-to-frequency module.

Furthermore, the capacitance-to-frequency module may be based on a circuit which produces a wave data with a frequency proportional to the change in capacitance 1304. Thus, a higher resolution of the measurement may be possible when the frequency results in a high value (e.g., in the order of million cycles per second) and/or is modulated to the high value. Thus, one may be able to obtain the change in frequency 1310 of the sensor 1300 by subtracting a number of wave forms per second when there is no force present from a number of wave forms per second when the force 1306 is applied on the sensor 1300.

Data which encompasses the change in capacitance 1304, the change in voltage 1308, and/or the change in frequency 1310 may be provided to a digitizer module 1312 (e.g., an analog-to-digital converter). Lastly, the digitizer module 1312 may work with the processing module 1314 (e.g., a microprocessor which may be integrated in a signaling circuit of the layered PCB 1210 of FIG. 12) to convert the change in capacitance 1304, the change in voltage 1308, and/or the change in frequency 1310 to a measurement 1316 (e.g., a measurement of the force 1306 applied to the sensor 1300).

Figure 14:
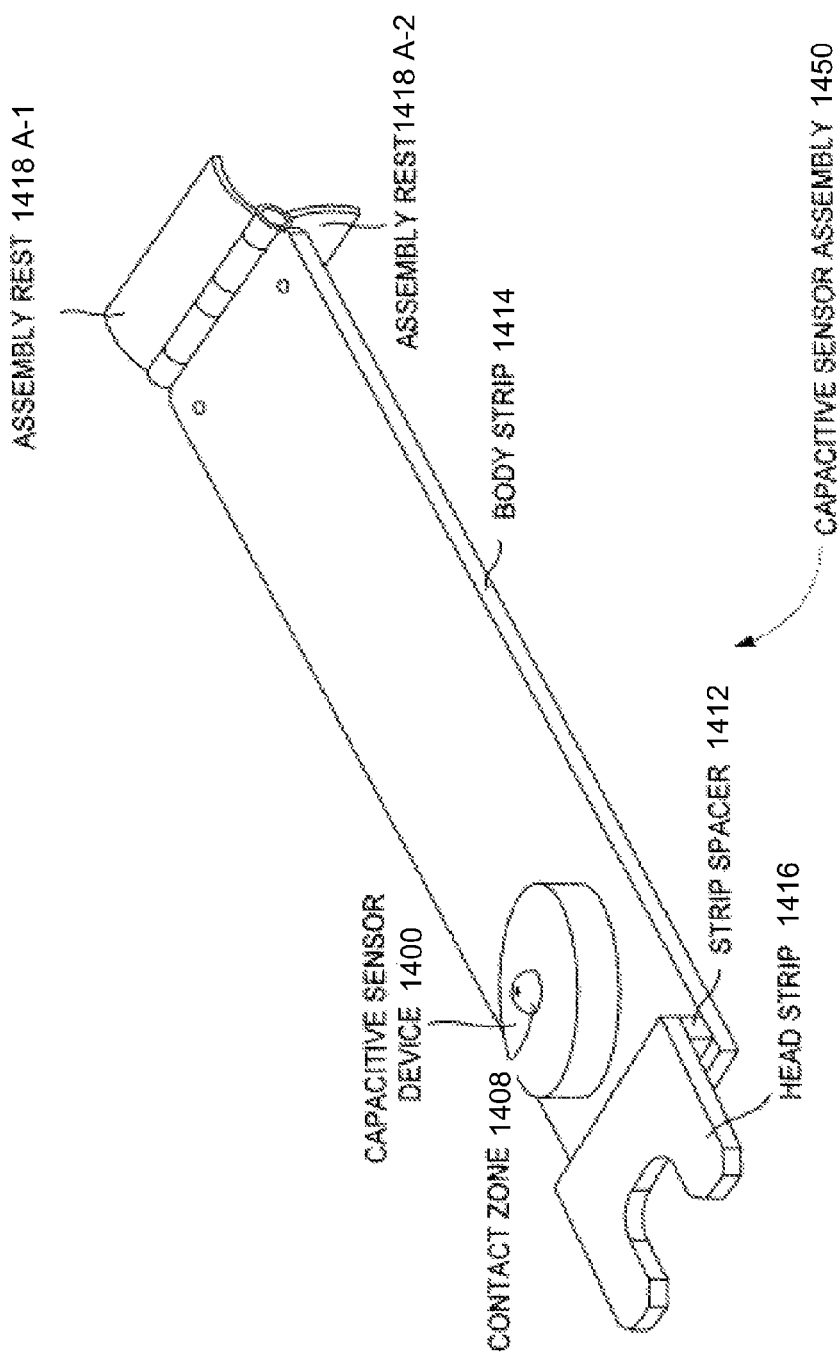
FIG. 14 is a three-dimensional view of a capacitive sensor assembly which may be used to weigh an indiscrete volume of a dispenser, according to one embodiment.

FIG. 14 is a three-dimensional view of a capacitive sensor assembly 1450 which may be used to weigh an indiscrete volume of a dispenser, according to one embodiment. Particularly, FIG. 14 illustrates the capacitive sensor assembly 1450 having a capacitive sensor 1400 (e.g., the capacitive sensor device 1100 of FIG. 11), a contact zone 1408, a strip spacer 1412, a body strip 1414, a head strip 1416, and an assembly rest 1418. The capacitive sensor device 1400 may have a sensor capacitor (e.g., the sensor capacitor 1214 of FIG. 12) and/or a reference capacitor (e.g., the reference capacitor 1216). The contact zone 1408 may provide a junction point where a load and/or a force may be applied so that a capacitance may be measured on the capacitive sensor device 1400.

The strip spacer 1412 may be a block (e.g., which may be a same material as the body strip 1414 and the head strip 1416) which is used to form a gap between the body strip 1414 and the head strip 1416. The gap may be adjusted to provide an optimal position of the capacitive sensor device 1400 which may be used to weigh a measurement of an indiscrete volume. The body strip 1414 may be a board (e.g., made of a plastic, a metal, a wood, a plexiglass, etc.) where the capacitive sensor device 1400 may be mounted (e.g., using a fastener). The head strip 1416 may be a board (e.g., which may and/or may not be made of a same material as the body strip 1414) which may be smaller in size than the body strip 1414 such that the head strip 1416 may come in contact with a bottom of an upper housing (e.g. an upper housing 1560 of FIG. 15) of a dispenser device (e.g., a dispenser device 1780) to provide a grip of one end of the capacitive sensor assembly 1450.

The assembly rest 1418 (e.g., which may be made of a plastic, a plexglass, a metal, a wood, etc.) may provide a grip for the other end of the capacitive sensor assembly 1450. In one embodiment, the assembly rest 1418 may be a single flap which may be folded underneath of the capacitive sensor assembly 1450. In another embodiment, the capacitive sensor assembly 1450 may be multiple flaps (e.g., the assembly rest 1418A, the assembly rest 1418B, etc.) which may be folded underneath of the capacitive sensor assembly 1450.

Figure 15:
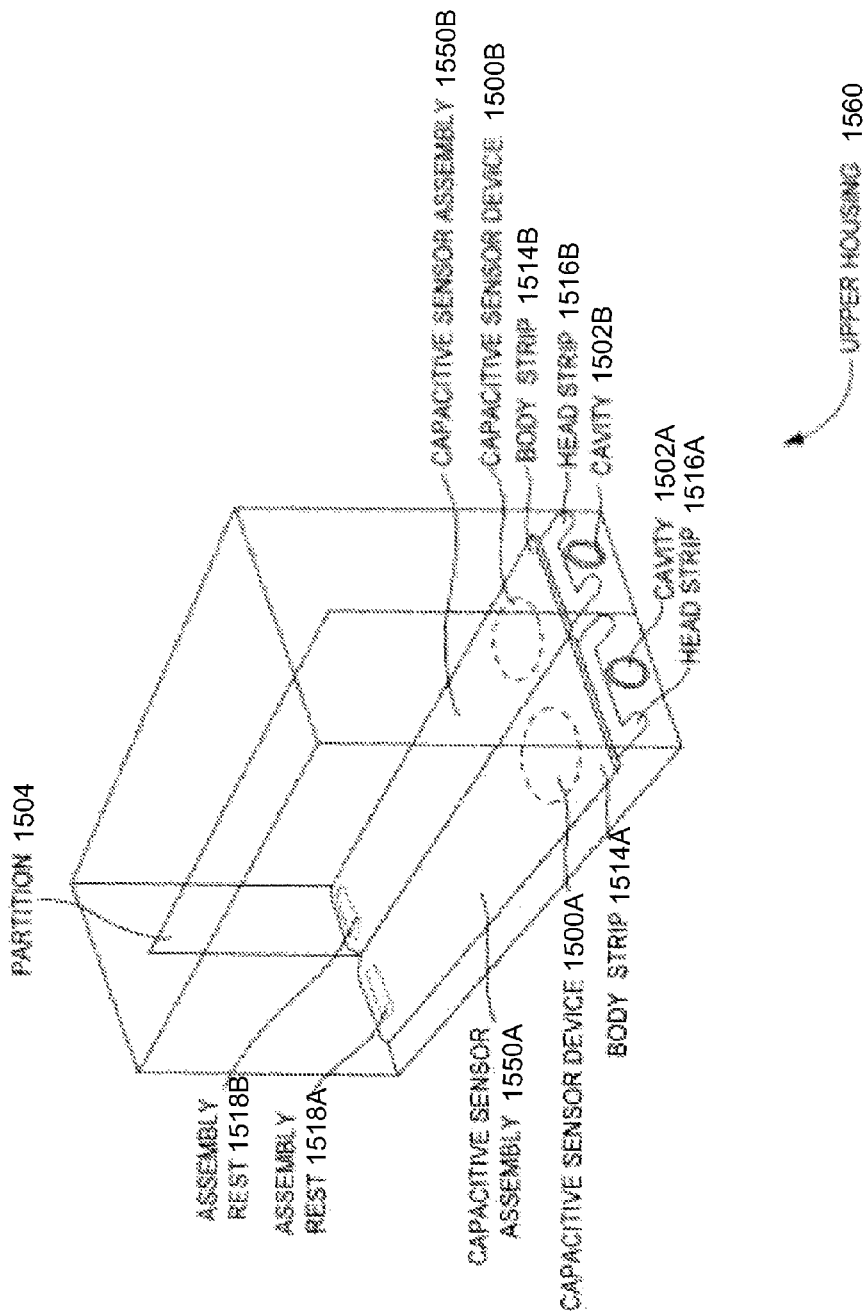
FIG. 15 is a three-dimensional view of an upper housing of a dispenser device, according to one embodiment.

FIG. 15 is a three-dimensional view of an upper housing 1560 of a dispenser device, according to one embodiment. Particularly, FIG. 15 illustrates an upper housing 1560 having a capacitive sensor device 1500, a cavity 1502, a partition 1504, a body strip 1514, a head strip 1516, an assembly rest 1518, and/or a capacitive sensor assembly 1550. The upper housing may be an upper part of a dispenser device (e.g., a dispenser device 1780 of FIG. 17). The capacitive sensor device 1500, the body strip 1514, the head strip 1516, the assembly rest 1518, and/or the capacitive sensor assembly 1550 may be associated (e.g., same and/or similar in functions and/or features) with the capacitive sensor device 1400 of FIG. 14, the body strip 1414, the head strip 1416, the assembly rest 1418, and/or the capacitive sensor assembly 1450, respectively.

Figure 16:
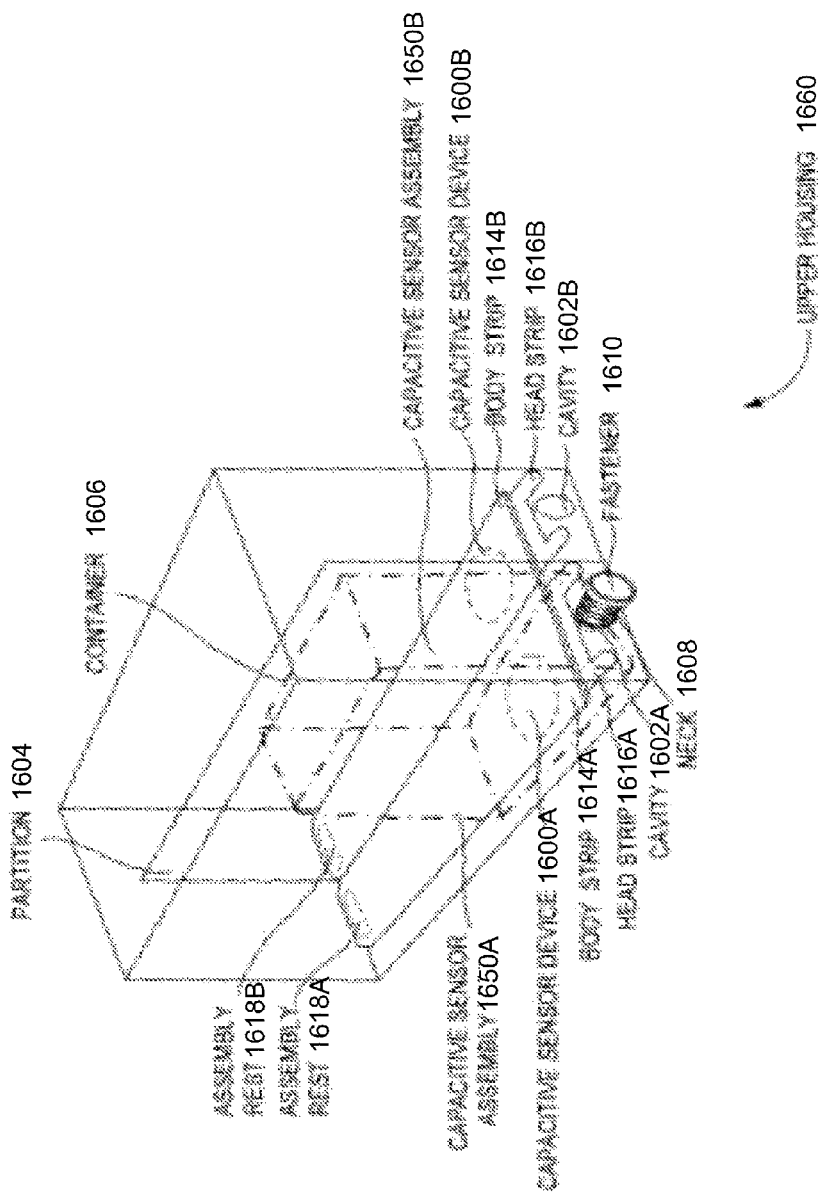
FIG. 16 is a three-dimensional view of an upper housing having a container 1606 of a dispenser device, according to one embodiment.

The cavity 1502 may provide an opening of a container holding a content (e.g., which may be in an indiscrete volume as in the container 1606 of FIG. 16) where the content may be dispensed through the cavity 1502. The partition 1504 may separate one discrete volume (e.g. of the container 1606) from another discrete volume. A number of the partition 1504 used may be in multiple numbers. In one example embodiment, if four discrete volumes are in a dispenser device, three partitions may be used to separate the four discrete volumes.

Furthermore, the capacitive sensor assembly 1550 may be placed at bottom of the upper housing 1560 where the capacitive sensor device 1500 may be facing downward. The capacitive sensor device 1500 may have a single contact zone (e.g., the contact zone 1108 of FIG. 11, the contact zone 1208 of FIG. 12 and/or the contact zone 1408 of FIG. 14) or multiple contact zones which may be pressed when a load (e.g., an indiscrete volume of the container 1606 of FIG. 16) is applied on top of the capacitive sensor assembly 1550.

The head strip 1516 may provide a grip which may be used to prevent the capacitive sensor assembly 1550 from slipping laterally (e.g., when the load is applied on top of the capacitive sensor assembly 1550) and/or to provide an optimum contact between the capacitive sensor device 1500 and a bottom surface of the upper housing 1560. The assembly rest 1518 may provide another grip which may be used to prevent the capacitive sensor assembly 1550 from slipping laterally (e.g., when the load is applied on top of the capacitive sensor assembly 1550) and/or to provide an optimum contact between the capacitive sensor device 1500 and the bottom surface of the upper housing 1560.

FIG. 16 is a three-dimensional view of an upper housing 1660 having a container 1606 of a dispenser device, according to one embodiment. Particularly, FIG. 16 illustrates an upper housing 1660 having a capacitive sensor device 1600, a cavity 1602, a partition 1604, a container 1606, and/or a capacitive sensor assembly 1650. The container 1606 may have a neck 1608 and/or a fastener 1610. The capacitive sensor assembly 1650 may include a capacitive sensor device 1600, a body strip 1614, a head strip 1616, and/or an assembly rest 1618.

The capacitive sensor device 1600, the body strip 1614, the head strip 1616, the assembly rest 1618 of the capacitive sensor assembly 1650 may be associated (e.g., same and/or similar in functions and/or features) with the capacitive sensor device 1500 of FIG. 15, the body strip 1514, the head strip 1516, the assembly rest 1518 of the capacitive sensor assembly 1550, respectively. The cavity 1602 and the partition 1604 of the upper housing 1660 may be similar and/or identical with the cavity 1502 and the partition 1504 of the upper housing 1560 of FIG. 15.

The container 1606 may be used to hold an indiscrete volume of a content (e.g., a beverage, a liquid, a fluid, a condiment, etc.). The container 1606 may be made of a vinyl, a plastic, a synthetic material, and/or other materials which may vary its shape due to the nature of the content (e.g., having an indiscrete volume). The neck 1608 of the container 1606 may extend out of the upper housing 1660 through the cavity 1602. The fastener 1610 (e.g., a cap, a cork, etc.) may be used to control a flow of the content (e.g., a beverage, a condiment, etc.). Thus, when a dispenser device (e.g., a coffee dispensing machine, a soda dispensing machine, a milk dispensing machine, etc.) is on, the fastener 1610 may remain open.

Figure 17:
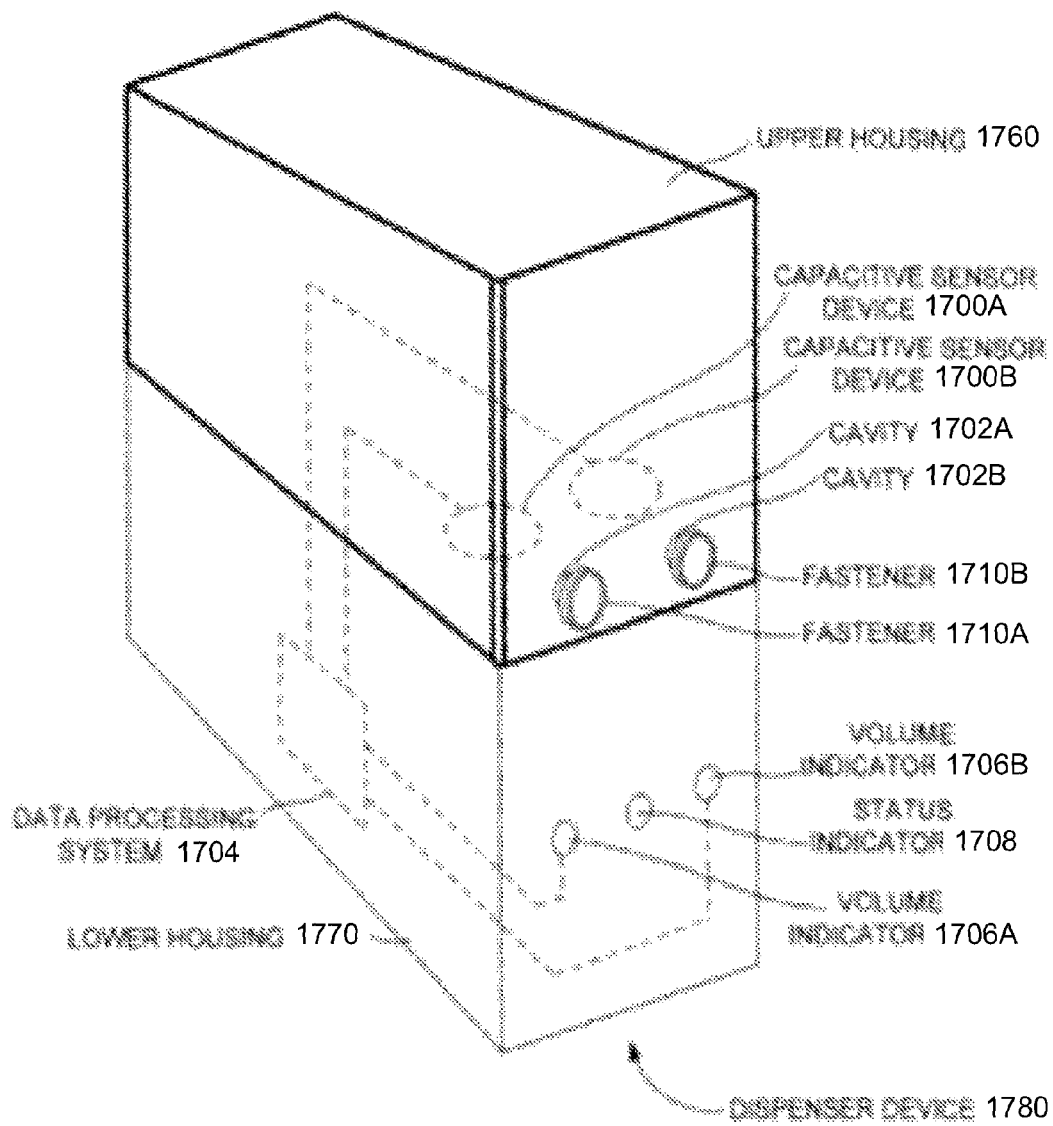
FIG. 17 is a three-dimensional view of a dispenser device having a data processing system, according to one embodiment.

FIG. 17 is a three-dimensional view of a dispenser device 1780 having a data processing system 1704, according to one embodiment. Particularly, FIG. 17 illustrates a dispenser device 1780 having an upper housing 1760 and/or a lower housing 1770. The upper housing 1760 may have a capacitive sensor device 1700, a cavity 1702, a fastener 1710, and/or other components (e.g., See FIG. 16).

The lower housing 1770 may have a data processing system 1704, a volume indicator 1706, and/or a status indicator 1708. The data processing system 1704 may process a measurement data from the capacitive sensor device 1700. The volume indicator 1706 may be a light emitting diode (LED) (e.g., and/or other lighting source) which may be turned on when a volume of a content (e.g., in the container 1606 of FIG. 16) in the dispenser device 1780 is less than a threshold value (e.g., a weight which may be set by a user and/or a maintenance person of the dispenser device 1780). The status indicator 1708 may be a light emitting diode (LED) (e.g., and/or other lighting source) which may be turned on when the dispenser device 1780 is in use.

In one example embodiment, the capacitive sensor device 1700 may communicate (e.g., periodically and/or continually) with the data processing system 1704 of the dispenser device 1780 when the dispenser device 1780 is active (e.g., which may be indicated by the status indicator 1708). The capacitive sensor device 1700 may communicate a measurement (e.g., which may be an analog and/or a digital signal in a form of a capacitance, a voltage, and/or a frequency value of the content being measured by the capacitive sensor device 1700) to the data processing system 1704.

The data processing system 1704 may then process the measurement (e.g., through comparing the measurement with a threshold value set by the user) and communicate a command data to control the volume indicator 1706. The status indicator 1708 may be turned on when a load applied on top of the capacitive sensor device 1700 (e.g., mounted on the capacitive sensor assembly 1650) is measured to be less than a threshold value (e.g., which may be $\frac{1}{10}^{th}$ of the load in full capacity).

In another example embodiment, the data processing system 1704 may be positioned outside of the dispenser device 1780. The capacitive sensor device 1700 in this case may communicate the measurement to the data processing system 1704 wirelessly, and the data processing system 1704 may control the status indicator 1708 wirelessly once the data processing system 1704 processes the measurement as will be illustrated in FIG. 18.

Figure 18:
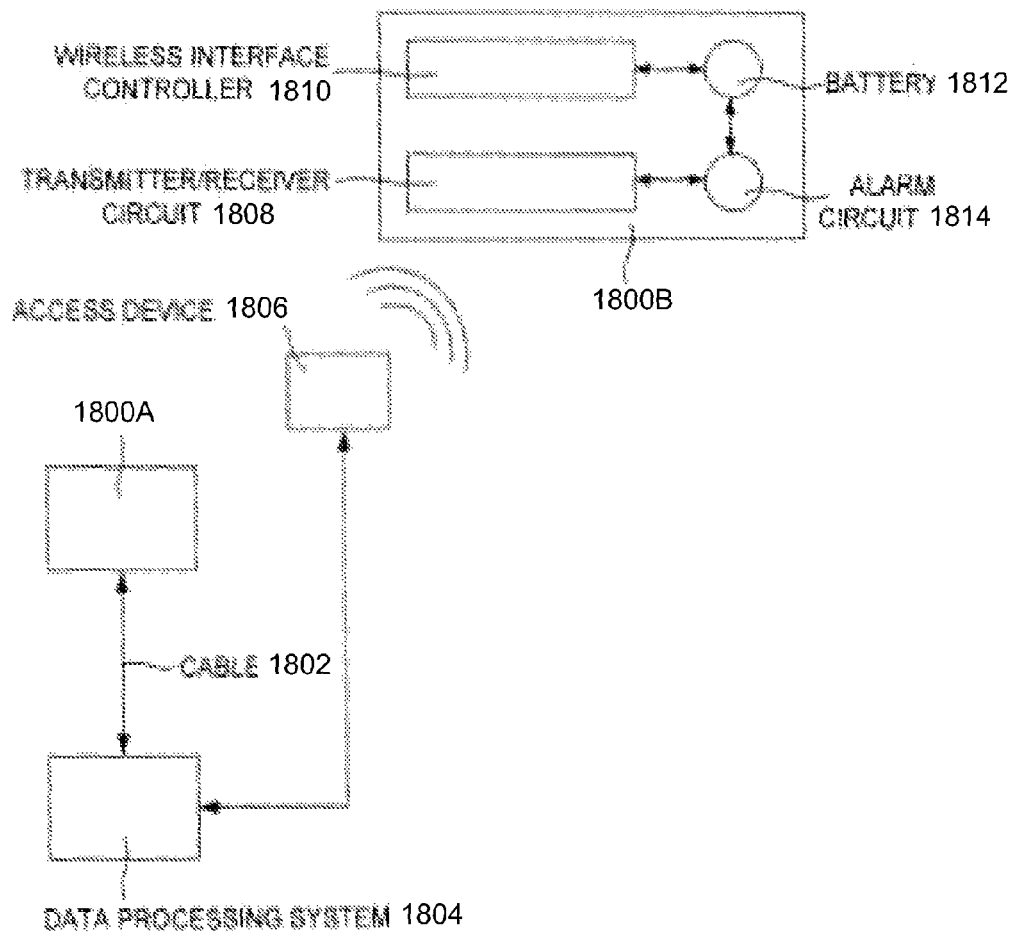
FIG. 18 is a network enabled view of a capacitive sensor device, according to one embodiment.

FIG. 18 is a network enabled view of a capacitive sensor device 1800, according to one embodiment. The capacitive sensor device 1800A is connected to a data processing system 1804 through a cable 1802 as illustrated in FIG. 18. The capacitive sensor device 1800A is also connected to a network (e.g., an internet, a local area network, etc.). The capacitive sensor device 1800B is wirelessly connected to the network through an access device 1806 (e.g., a device which enables wireless communication between devices forming a wireless network).

The capacitive sensor device 1800B includes a transmitter/receiver circuit 1808 and a wireless interface controller 1810 (e.g., for wireless communication), a battery 1812 (e.g., to sustain as a standalone device), and an alarm circuit 1814 (e.g., to alert a user when a force to the capacitive sensor device 1800 B is greater than a threshold value and/or when the battery is almost out). The transmitter/receiver circuit 1808 and/or the wireless interface controller 1810 may be integrated into the processing module 1314 of FIG. 13.

A data processing system 1804 may receive data (e.g., output data measuring a force and/or a load, etc.) from the capacitive sensor device 1800A and/or the capacitive sensor device 1800B through the network. In one embodiment, the data processing system 1804 analyzes data (e.g., measurements) generated by various operation of the capacitive sensor device 1800. In another example embodiment, a universal serial bus (USB) may be included in the circuitry of the capacitive sensor device 1800. The USB (e.g., a USB port or hub with mini sockets) may allow a hardware interface (e.g., user-friendly) for a data processing system (e.g., the data processing system 1804) and/or a hardware interface for attaching peripheral devices (e.g., a flash drive).

Figure 19:
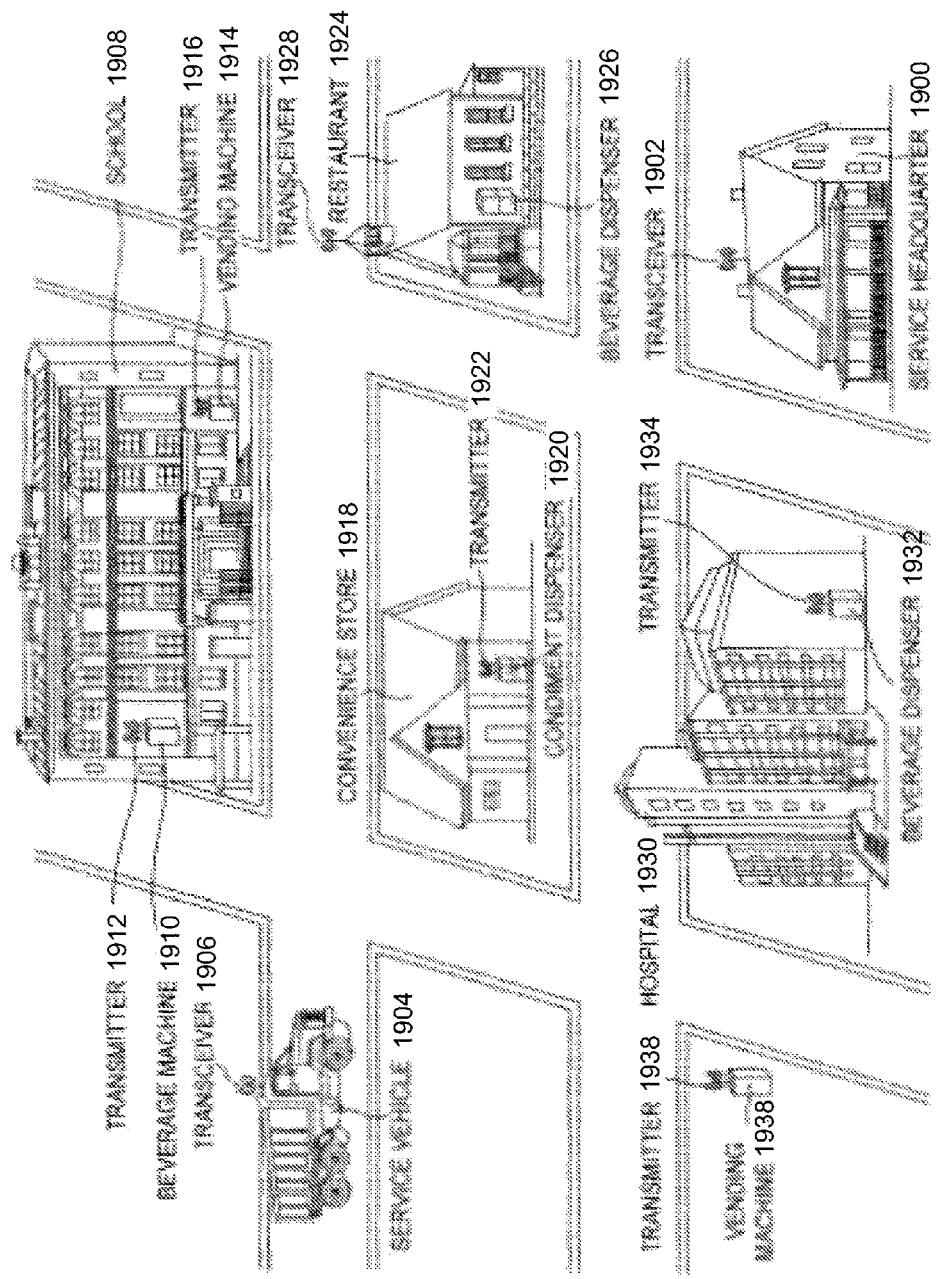
FIG. 19 is a conceptual diagram of a service associated with a dispenser device, according to one embodiment.

FIG. 19 is a conceptual diagram of a service associated with a dispenser device, according to one embodiment. Particularly, FIG. 19 illustrates a service headquarters 1900, a transceiver 1902, a service vehicle 1904, a transceiver 1906, a school 1908, a beverage machine 1910, a transmitter 1912, a vending machine 1914, a transmitter 1916, a convenience store 1918, a condiment dispenser 1920, a transmitter 1922, a restaurant 1924, a beverage dispenser 1926, a transceiver 1928, a hospital 1930, a beverage dispenser 1932, a transmitter 1934, a vending machine 1936, and/or a transmitter 1938.

The service headquarters 1900 may be a place where the service (e.g., installment, and/or maintenance of the dispenser device and/or delivery of supply items associated with the dispenser device) is conducted. The service vehicle 1904 may be a transportation device which may be used by an agent of a service provider associated with the dispenser device. The transceiver 1906 may be a communication device on the service vehicle which may be used to communicate between the service vehicle 1904 and the service headquarters 1900.

The school 1908 may be a private and/or public educational institution. The beverage machine 1910 may be an electromechanical apparatus which may be used to vend a beverage (e.g., coffee, orange juice, cola, etc.). The transmitter 1912 may communicate a status (e.g., the machine on, the machine off, the beverage running out, the beverage filled, etc.) of the beverage machine 1910 to the service headquarter 1900. The vending machine 1914 may be a dispenser device having a capacitive sensor device weighing a load in indiscrete volume (e.g., a beverage measured in units of cups) and/or in discrete volume (e.g., a beverage measured in units of cans, bottles, etc.). The transmitter 1916 may communicate a status (e.g., the machine on, the machine off, beverage running out, beverage filled, etc.) of the beverage machine 1910 to the service headquarter 1900.

The convenience store 1918 may be a private (e.g., retail) business. The condiment dispenser 1920 may be an electromechanical apparatus which may be used to dispense one or more condiments (e.g., a ketchup, a mayonnaise, mustard, salt, pepper, etc.). The transmitter 1922 may communicate a status (e.g., the machine on, the machine off, the beverage running out, the beverage filled, etc.) of the condiment dispenser 1920 to the service headquarter 1900.

The restaurant 1924 may be a business entity where a food and/or a beverage may be served for profit. The beverage dispenser 1926 may be an electromechanical apparatus which may be used to dispense a beverage (e.g., a coffee, an orange juice, a cola, etc.). The beverage dispenser 1926 (e.g., which may not have a wireless communication capability) may be monitored by the user (e.g., the owner and/or the employee of the restaurant 1924). The transceiver 1928 of the restaurant 1924 may be used to communicate with the service headquarter 1900.

The hospital 1930 may be a profit and/or nonprofit health organization. The beverage dispenser 1932 may be an electromechanical apparatus which may be used to vend a beverage (e.g., coffee, orange juice, cola, etc.). The transmitter 1934 may communicate a status (e.g., the machine on, the machine off, beverage running out, beverage filled, etc.) of the beverage dispenser 1932 to the service headquarter 1900.

The vending machine 1936 on a street corner may be a dispenser device having a capacitive sensor device weighing a load in indiscrete volume (e.g., a beverage measured in units of cups) and/or in discrete volume (e.g., a beverage measured in units of cans, bottles, etc.). The transmitter 1938 may communicate a status (e.g., the machine on, the machine off, the beverage running out, the beverage filled, etc.) of the vending machine 1936 to the service headquarter 1900.

In one example embodiment, a service headquarter 1900 may be a branch office of a service provider who may be in a business of installing and/or maintaining a number of dispenser devices (e.g., the dispenser device 1780 of FIG. 17) and/or supplying contents (e.g., a beverage, a condiment, etc.) of the dispenser devices. The service headquarter 1900 may provide a service of a partial and/or an entire area of a city. When a signal data indicating a low level of a content of any one of the beverage devices is communicated from a client's place (e.g., the school 1908, the convenience store 1918, the restaurant 1924, etc.) to the service headquarter 1900 through a transmitter (e.g., transmitter 1912, the transmitter 1916, the transmitter 1922, the transmitter 1938, etc.) and/or a transceiver (e.g., the transceiver 1928, etc.), the service headquarter 1900 may communicate with the service vehicle 1904 (e.g., which may and/or may not be on the road) to deliver the content to the client's place through the transceiver 1902 and/or the transceiver 1906.

In another example embodiment, a user of the beverage dispenser 1926 may communicate with the service headquarter 1900 through a wireless device and/or a telephone when the user learns that a content of the beverage dispenser 1926 has run out of the content. The example embodiments illustrate a cost and/or time-efficient way of maintaining dispenser devices as well as providing clients of products dispensed through the dispenser devices in fresh and/or better quality.

Figure 20:
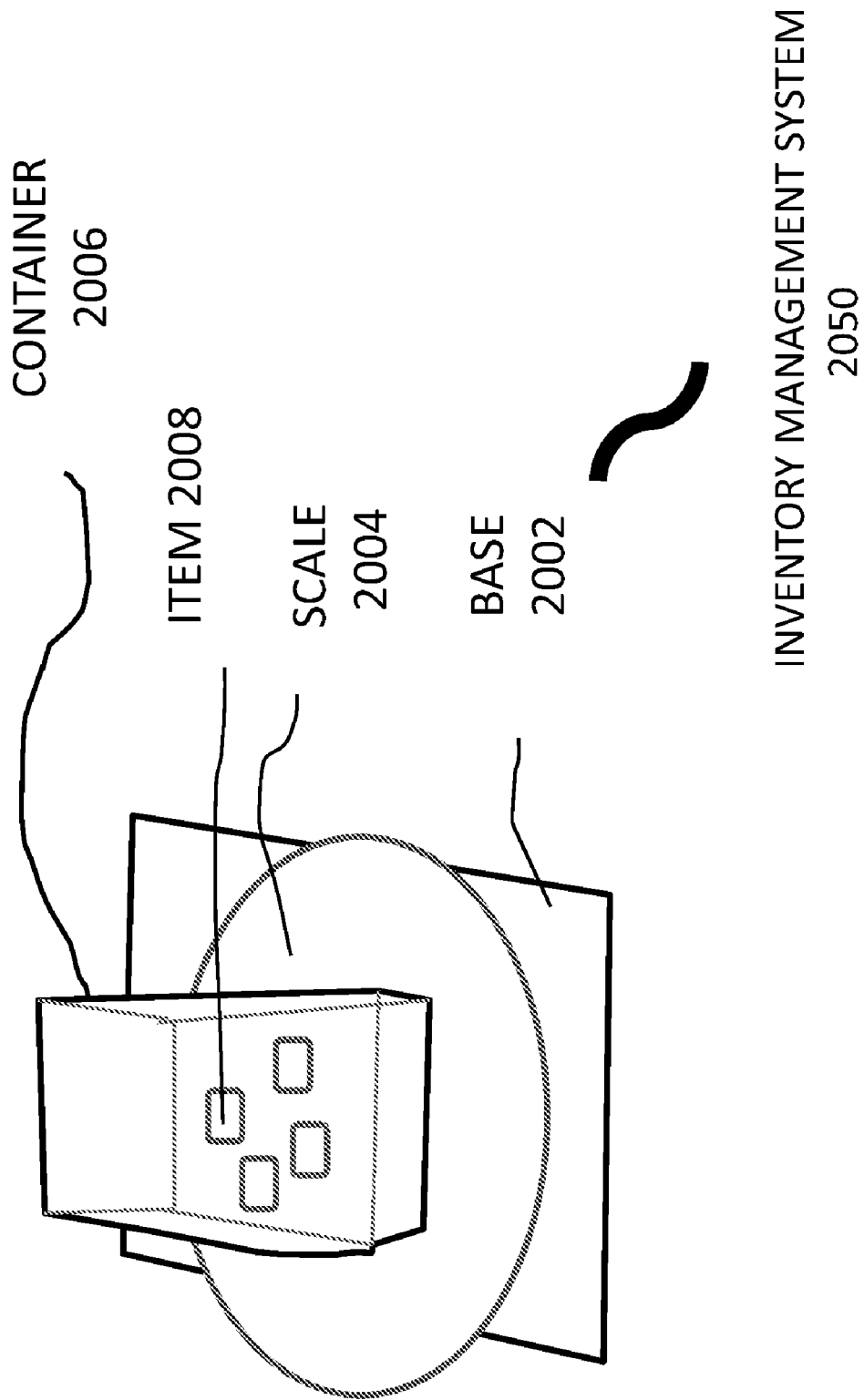
FIG. 20 is a three-dimensional view of an inventory management system having a container to measure a weight of at least one item, according to one embodiment.

FIG. 20 is a three-dimensional view of an inventory management system 2050 having a container 2006 (e.g., a receptacle, a transportable bin, etc.) to measure a weight of at least one item 2008 (e.g., a liquid, a solid, a discrete part, a fluid, a gas, a powder, etc.). The container is illustrated as being placed above a base 2002 (e.g., a base plate, a floor, a surface, a sidewall, etc.) having a scale 2004 (e.g., a platform). A shortage of the item 2008 may be indicated by the inventory management system when the measurement of the item varies (e.g., from a tolerance weight). A force (e.g., the force 1106 of FIG. 11) may be applied when items are placed in the container and a top surface of the scale is deflected. This may cause a distance between capacitive plates forming the capacitive sensor in the scale (as illustrated in FIG. 22) to change, thereby causing a change in capacitance.

Figure 21:
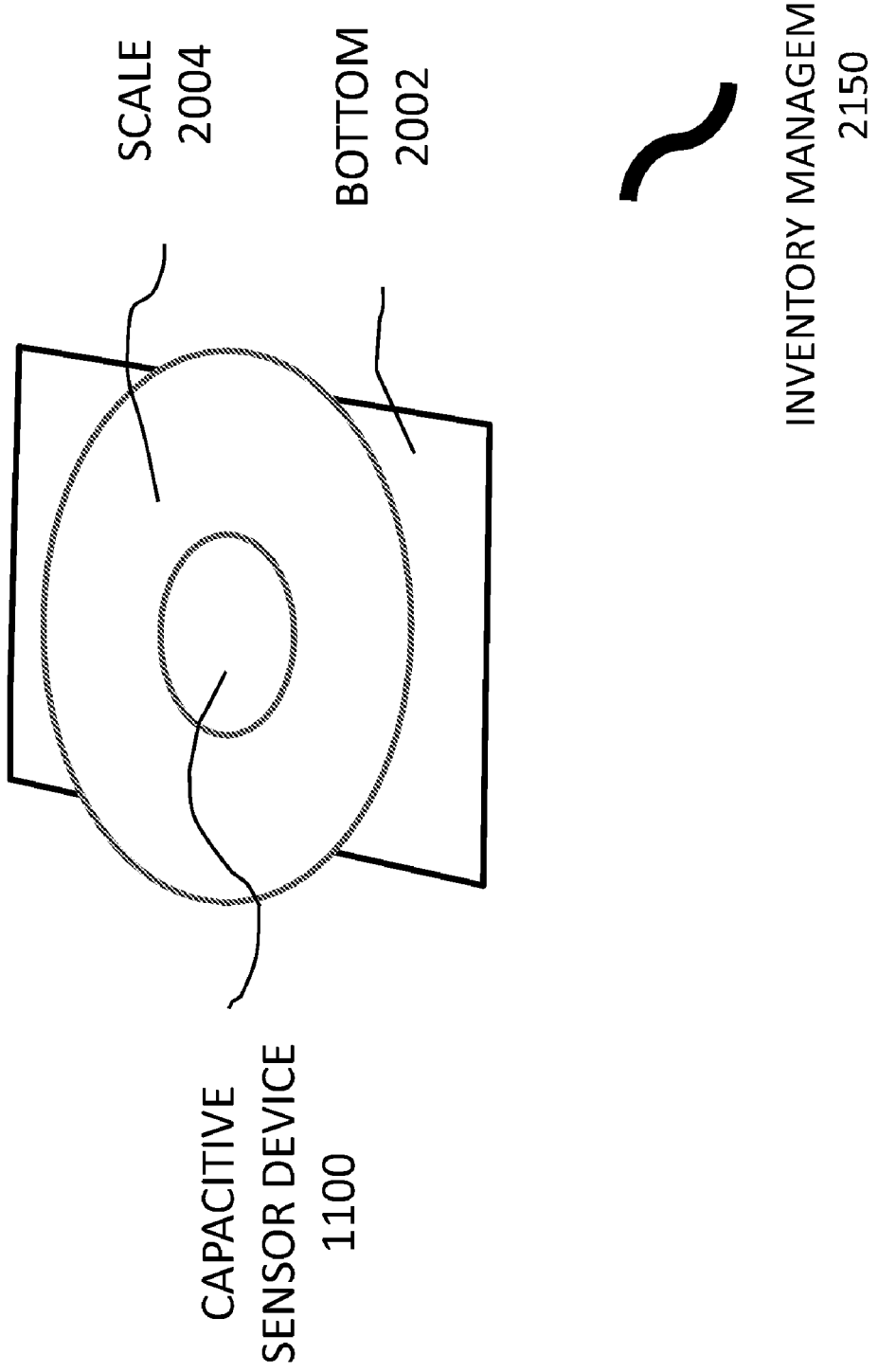
FIG. 21 is a three-dimensional view of the inventory management system having a scale formed with a set of plates having inserted between the set of plates the first conductive surface and the second conductive surface, according to one embodiment.

FIG. 21 is a three-dimensional view of the inventory management system 2150 having a scale 2004 formed with a set of plates having inserted between the set of plates the first conductive surface and the second conductive surface (e.g., creating the capacitive sensor 1100 as illustrated in FIG. 21), according to one embodiment. The scale 2004 may include a set of conductive plates having the capacitive sensor device (e.g., the capacitive sensor device 1100 of FIG. 11). For example, the capacitive sensor device may be created through an upper conductive surface and a lower conductive surface that is inserted (e.g., sandwiched) in the scale 2004 of FIG. 21.

Figure 22A:
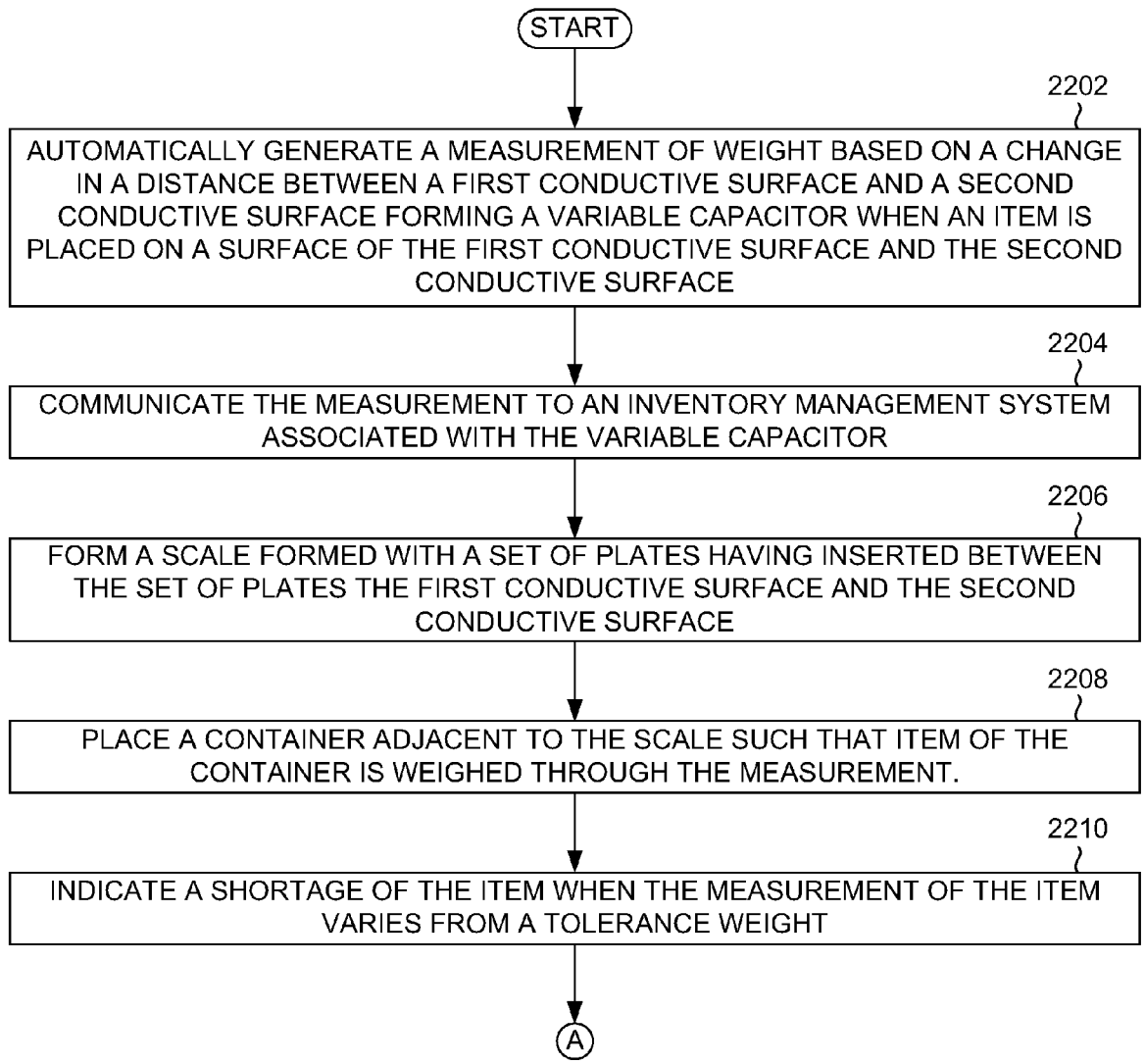
FIG. 22A is a process flow of generating a measurement of weight based on change in distance between the conductive surfaces, according to one embodiment.

FIG. 22A is a process flow of generating a measurement of weight based on change in distance between the conductive surfaces (e.g., of a capacitive sensing device such as the capacitive sensor device 1100 of FIG. 11 and/or the capacitive sensor module 108 of FIG. 1, etc.), according to one embodiment. In operation 2202, a measurement of weight (e.g., load, force, etc.) may be generated automatically based on a change in a distance between a first conductive surface and a second conductive surface forming a variable capacitor when an item is placed on a surface of the first conductive surface and the second conductive surface (e.g., as illustrated in FIG. 3).

In operation 2204, the measurement (e.g., a data signal) may be communicated (e.g., via cable, through a network, wirelessly, etc.) to an inventory management system associated with the variable capacitor (e.g., as illustrated in FIG. 8). In operation 2206, a scale formed with a set of plates (e.g., as illustrated in FIG. 21) may be formed having inserted between the set of plates the first conductive surface and the second conductive surface (e.g., as illustrated in FIGS. 6A and 6B.

In operation 2208, a container (e.g., the container 1606 of FIG. 16) may be placed adjacent to (e.g., on, in contact with, etc.) the scale such that an item of the container 1606 (e.g., may include a liquid, a solid, a discrete part, a powder, and a gas) is weighed through the measurement (e.g., may be of a force applied to a surface above the first conductive surface with respect to the second conductive surface) as illustrated in FIG. 2 and FIG. 20. In operation 2210, a shortage of the item may be indicated when the measurement of the item varies from a tolerance weight.

Figure 22B:
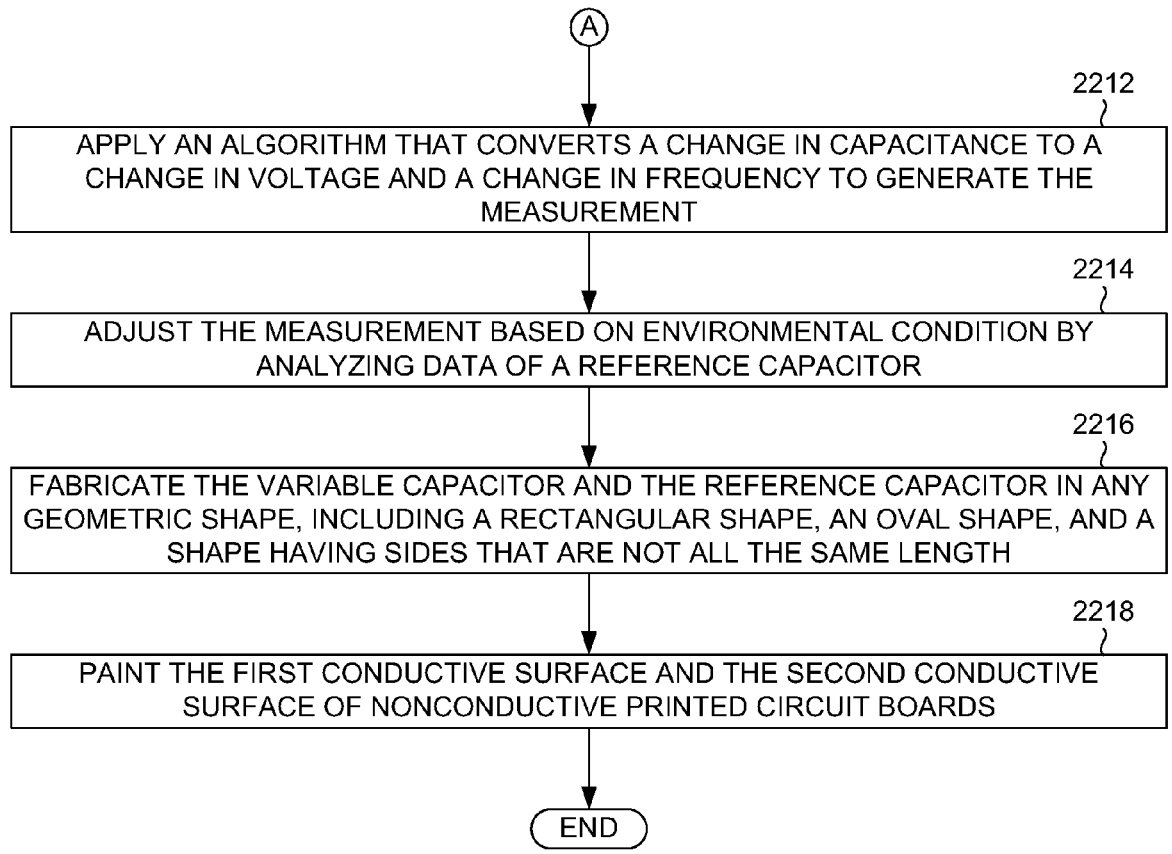
FIG. 22B is a continuation of the process flow of FIG. 22A illustrating additional processes, according to one embodiment.

FIG. 22B is a continuation of the process flow of FIG. 22A illustrating additional processes, according to one embodiment. In operation 2212, an algorithm may be applied that converts a change in capacitance to a change in voltage and a change in frequency to generate the measurement (e.g., using the capacitive sensor module 108 of FIG. 1). In operation 2214, the measurement based on environmental condition (e.g., humidity, temperature, air pressure, etc.) may be adjusted by analyzing data of a reference capacitor (e.g., the reference capacitor 216 of FIG. 2). In operation 2216, the variable capacitor and the reference capacitor may be fabricated in any geometric shape, including a rectangular shape, an oval shape, and a shape having sides that are not all the same length. In operation 2218, the first conductive surface and the second conductive surface may be painted on non-conductive printed circuit boards (PCBs), as illustrated in FIGS. 6A and 6B.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the local inventory module 102, the supplier inventory module 104, the container modules 106A-N, the capacitive sensor modules 108A-N, the digitizer modules 712 and 1312 and/or the processing module 714 and 1314 and other modules of FIGS. 1-21 may be enabled using a local inventory circuit, a supplier inventory circuit, container circuits, capacitive sensor circuits, digitizer circuits, processing circuits and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An inventory management system, comprising:
a first conductive surface and a second conductive surface substantially parallel to the first conductive surface;
a sensor of the inventory measurement system to generate a measurement based on a change in a distance between the first conductive surface and the second conductive surface such that an aggregate value of a stock of items is determined by said measurement;
a scale of the inventory measurement system formed with a set of plates having inserted between the set of plates the first conductive surface and the second conductive surface, wherein the scale to indicate a shortage of the at least one item when the measurement of the at least item varies from a tolerance weight; and
a container of the inventory measurement system placed above the scale such that at least one item of the container is weighed through the measurement.

2. The inventory management system of claim 1 wherein the at least one item of the container comprises a solid, a discrete part, a powder, and a gas.

3. The inventory management system of claim 1 further comprising a housing of the inventory measurement system that encompasses the first conductive surface, the second conductive surface, the sensor, the scale and the container placed above the scale.

4. The inventory management system of claim 1 wherein the change in the distance is caused by a deflection of the first conductive surface with respect to the second conductive surface; and wherein the deflection is at least one of a compressive force and an expansive force.

5. The inventory management system of claim 1 wherein the change in the distance is caused by a change in thickness of at least one spacer between the first conductive surface and the second conductive surface.

6. The inventory management system of claim 1 wherein the sensor applies an algorithm that converts a change in capacitance to at least one of a change in voltage and a change in frequency to generate the measurement.

7. The inventory management system of claim 6 wherein the measurement is of a force applied to a surface above the first conductive surface with respect to the second conductive surface.

8. The inventory management system of claim 7 wherein the change in the distance is caused by a load applied to the surface above the first conductive surface with respect to the second conductive surface.

9. The inventory management system of claim 8 wherein the first conductive surface and the second conductive surface form a sensor capacitor, and wherein a change in capacitance of the sensor capacitor is inversely proportional to the change in the distance between the first conductive surface and the second conductive surface.

10. The inventory management system of claim 1 further comprising a reference capacitor of the inventory measurement system associated with the apparatus to enable the sensor to adjust the measurement based on at least one environmental condition.

11. The inventory management system of claim 10 wherein the at least one environmental condition is humidity in a gap between the first conductive surface and the second conductive surface, a temperature of the apparatus, and an air pressure of an environment surrounding the apparatus.

12. The inventory management system of claim 1 wherein the first conductive surface and the second conductive surface are fabricated in any geometric shape, including a rectangular shape, an oval shape, and a shape having sides that are not all the same length.

13. An inventory management system of claim 1 wherein the first conductive surface and the second conductive surface are painted on a plurality of nonconductive printed circuit boards forming the apparatus.

14. The inventory management system of claim 1:
wherein the housing is formed by a plurality of metal plates that are each laser etched and bonded together to create the housing,
wherein the housing is formed by a single metal block that is milled to form the housing, and wherein the deflection of the at least one plate forming the sensor capacitor is caused by a load applied to the housing; and
wherein the measurement is of a force applied to the housing.

15. The inventory management system of claim 1 further comprising a shielding spacer of the inventory measurement system between the reference capacitor and a bottom of the housing to minimize an effect of a stray capacitance affecting the measurement, wherein a height of the shielding spacer is at least ten times larger than a plate spacer between plates of the reference capacitor and between plates of the sensor capacitor.

16. The inventory management system of claim 1 wherein an area of each plate forming the reference capacitor is at least ten times larger than an area of each plate forming the sensor capacitor to reduce the amount of amplification required in generating the measurement.

17. The inventory management system of claim 1 further comprising: a circuit of the inventory measurement system to determine a weight of at least one item of a bin when the bin having the at least one item is placed on a surface of the sensor capacitor after removing an effect of the environmental condition from a capacitance of the sensor capacitor.

18. The inventory management system of claim 1 wherein the circuit includes a wireless transmitter and a wireless receiver and wherein the apparatus communicates through a network with a data processing system that analyzes data generated by various operation of the apparatus.

* * * * *